United States Patent [19]
Odajima et al.

[11] Patent Number: 5,397,610
[45] Date of Patent: Mar. 14, 1995

[54] PLASTIC MOLDING HAVING LUSTER AND METHOD OF MOLDING THE SAME

[75] Inventors: Shingo Odajima; Shoji Ohtani, both of Ichikai; Tetsuhiro Osawa; Masanori Takita, both of Kamimikawa; Yukihiro Nakano, Wakayama, all of Japan

[73] Assignee: Kao Corporation, Tokyo, Japan

[21] Appl. No.: 10,860

[22] Filed: Jan. 29, 1993

[30] Foreign Application Priority Data

Jan. 30, 1992 [JP] Japan .................... 4-015591
Jan. 30, 1992 [JP] Japan .................... 4-015592

[51] Int. Cl.$^6$ .................... C08L 67/02; B65D 65/38; B32B 5/08
[52] U.S. Cl. .................... 428/35.7; 428/372; 428/364; 428/292; 428/175; 428/107; 428/174; 428/323; 428/327; 428/332; 428/338; 428/397; 428/401; 428/480; 428/483; 428/913; 525/165; 525/177; 525/935; 524/513
[58] Field of Search .................... 428/372, 364, 35.7, 428/292, 175, 107, 174, 323, 327, 332, 338, 397, 401, 480, 483, 913; 525/165, 177, 935; 524/513

[56] References Cited

U.S. PATENT DOCUMENTS

| | | | |
|---|---|---|---|
| 3,950,476 | 4/1976 | Fontijn | 264/174 |
| 4,444,817 | 4/1984 | Subramanian | 428/36 |
| 5,019,439 | 5/1991 | Momose | 428/178 |
| 5,053,258 | 10/1991 | Booze et al. | 428/36.6 |

FOREIGN PATENT DOCUMENTS

| | | |
|---|---|---|
| 398075 | 11/1990 | European Pat. Off. . |
| 433976 | 6/1991 | European Pat. Off. . |
| 61-24253 | 6/1986 | Japan . |
| 61-39336 | 9/1986 | Japan . |

OTHER PUBLICATIONS

Derwent Accession No. 79-286 87B, Questel Telesystems (WPIL), Abstract & JP-A-54-029 379.
Derwent Accession No. 80-706 49C, Questel Telesystems (WPIL), Abstract & JP-A-55-109 616.
Derwent Accession No. 79-864 69B, Questel Telesystems (WPIL), Abstract & JP-A-54-133 969.

*Primary Examiner*—William P. Watkins, III
*Attorney, Agent, or Firm*—Birch, Stewart, Kolasch & Birch

[57] ABSTRACT

A plastic molding produced by molding a resin composition comprising 98 to 50 parts by weight of a thermoplastic polyester resin (A) and 2 to 50 parts by weight of a resin (B) incompatible with the thermoplastic polyester resin (A), the resin (B) being dispersed in the resin (A), wherein the resin (B) has in a layer that is situated at an arbitrary depth from the outer surface of the plastic molding a substantially rodlike form satisfying the requirement represented by the following formulae (1) and (2) and is oriented in parallel to the outer surface of the plastic molding and in the direction of flow of the resin composition in molding:

$$1 \leq P/Q \leq 10 \quad (1)$$

$$(P+Q)/L \leq 0.5 \quad (2)$$

wherein L, P and Q represent the size of the particle of said resin (B) and respectively have the following values:

- L: the average length ($\mu$m) in the direction of stretching of the particle;
- P: the average major axis ($\mu$m) in the case where a section perpendicular to the direction of stretching of the particle is approximated to be elliptical; and
- Q: the average minor axis ($\mu$m) in the case where the section perpendicular to the direction of stretching of the particle is approximated to be elliptical.

8 Claims, 15 Drawing Sheets

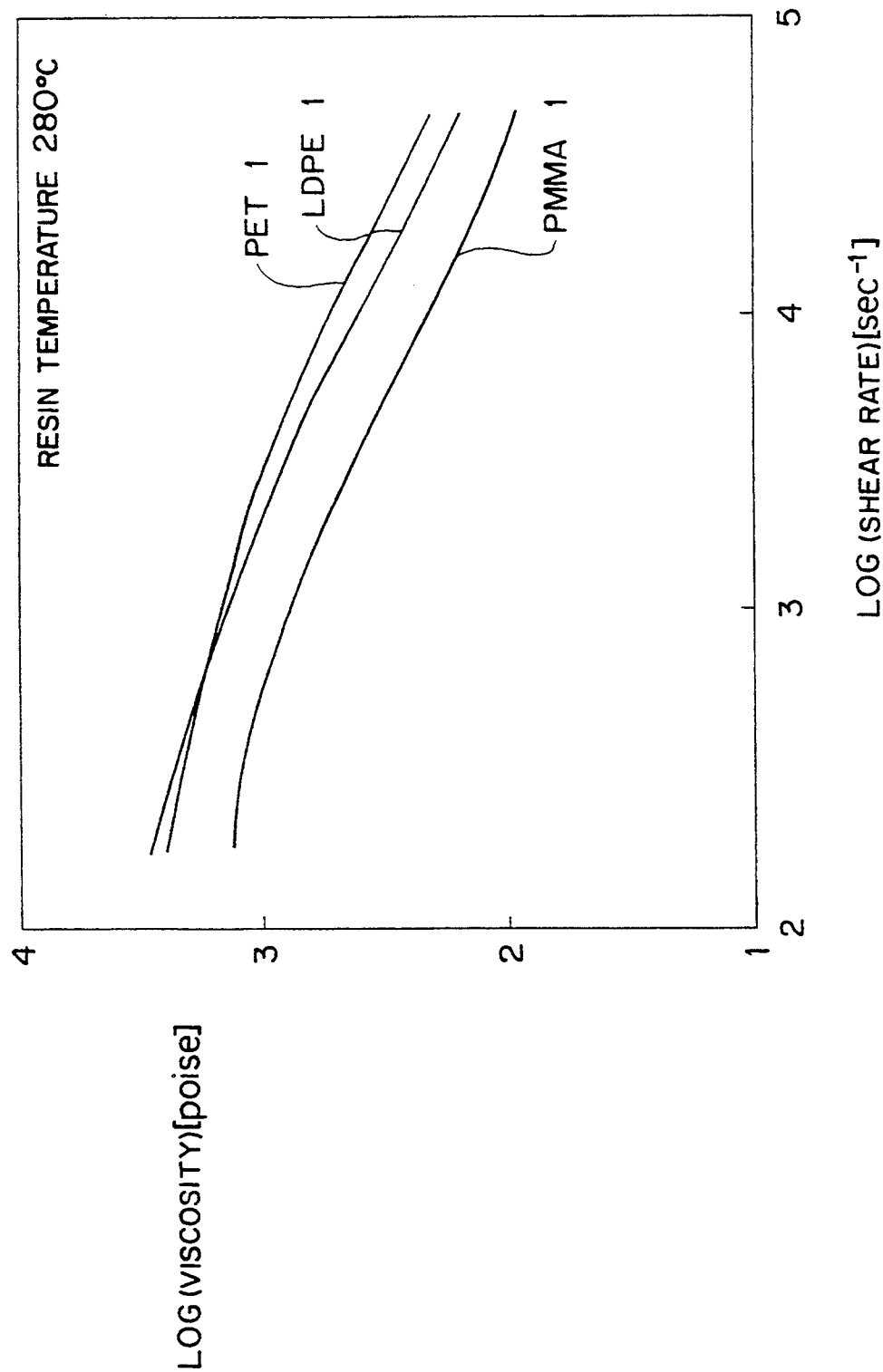

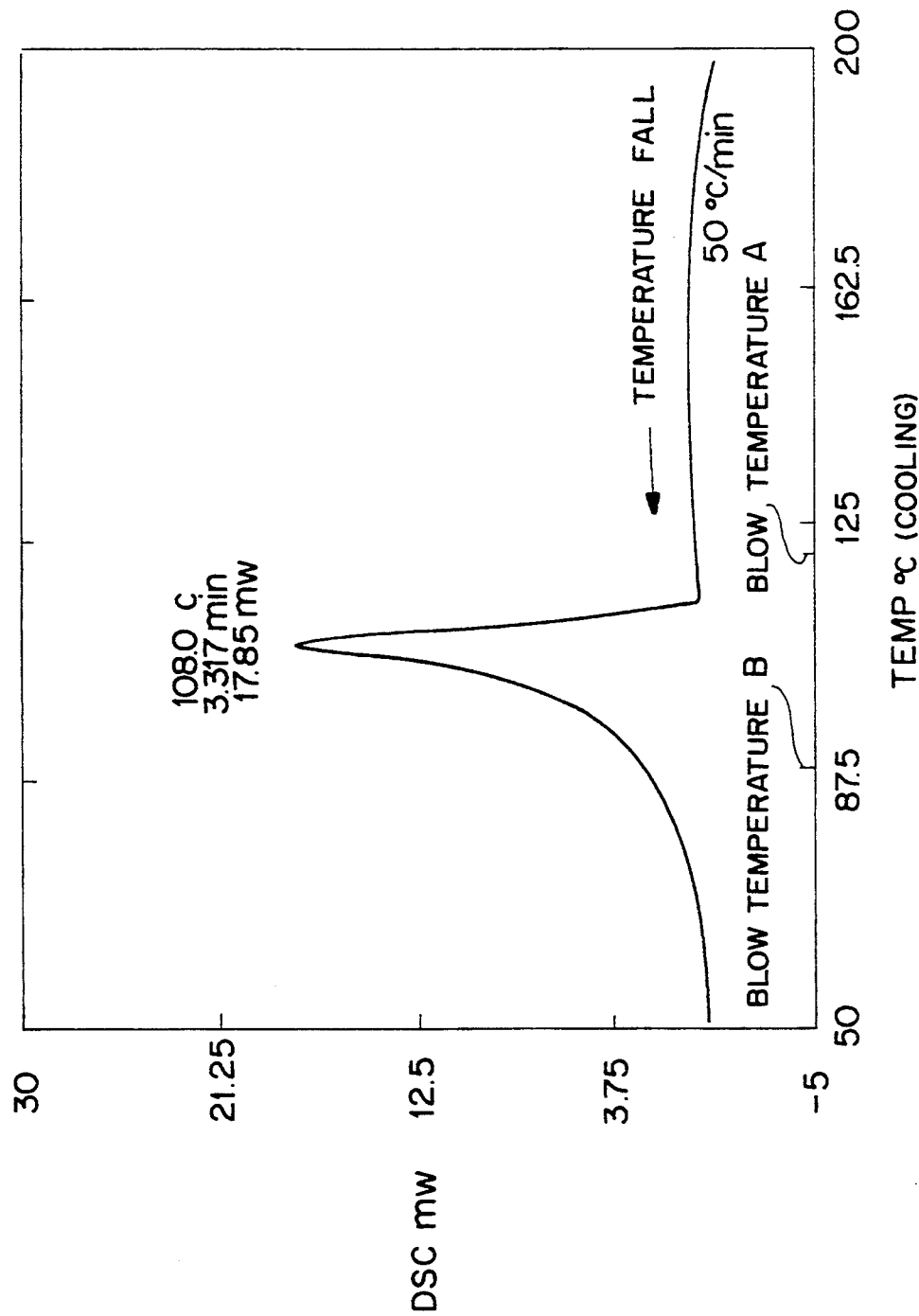

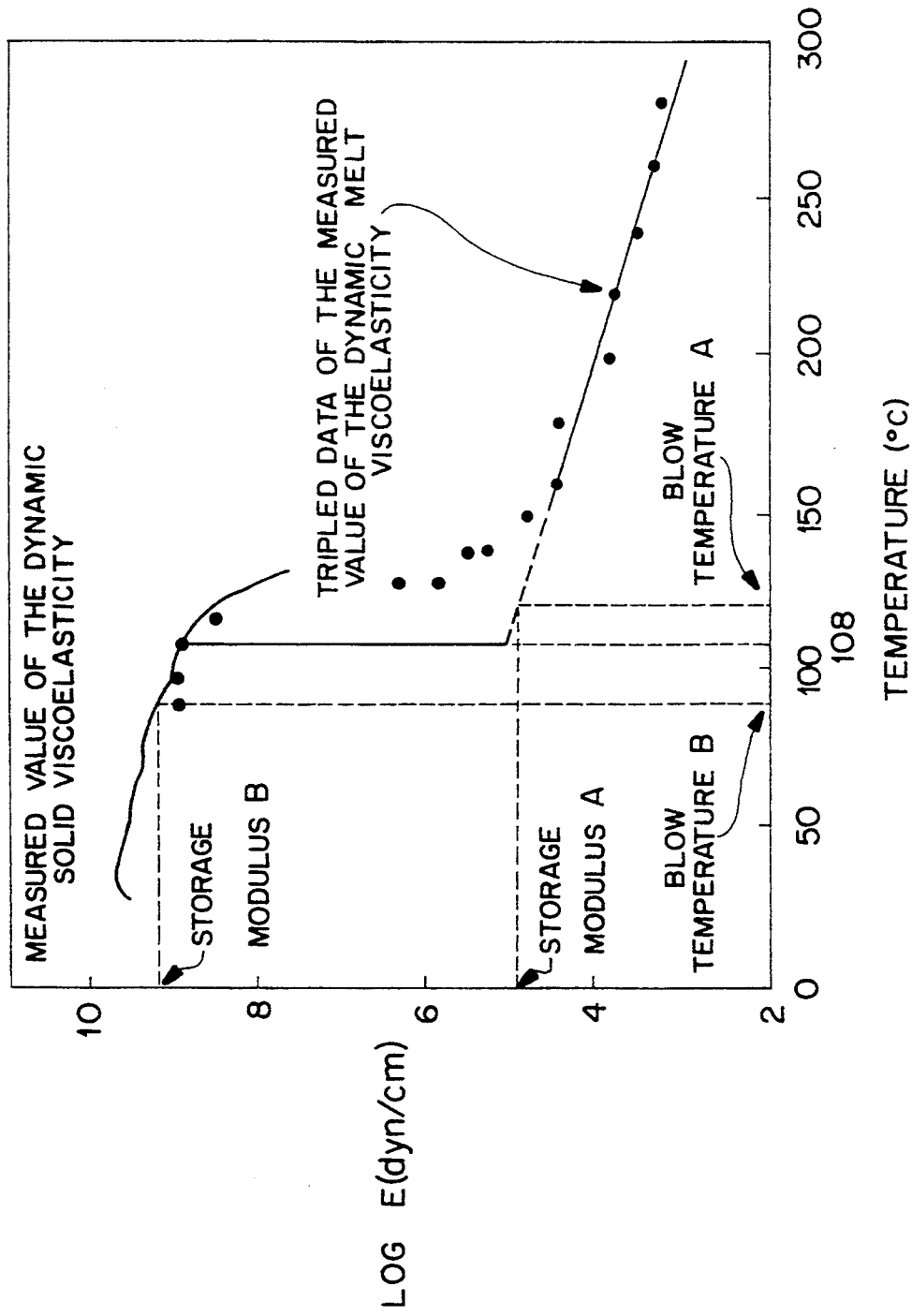

CROSS SECTION β

CROSS SECTION α

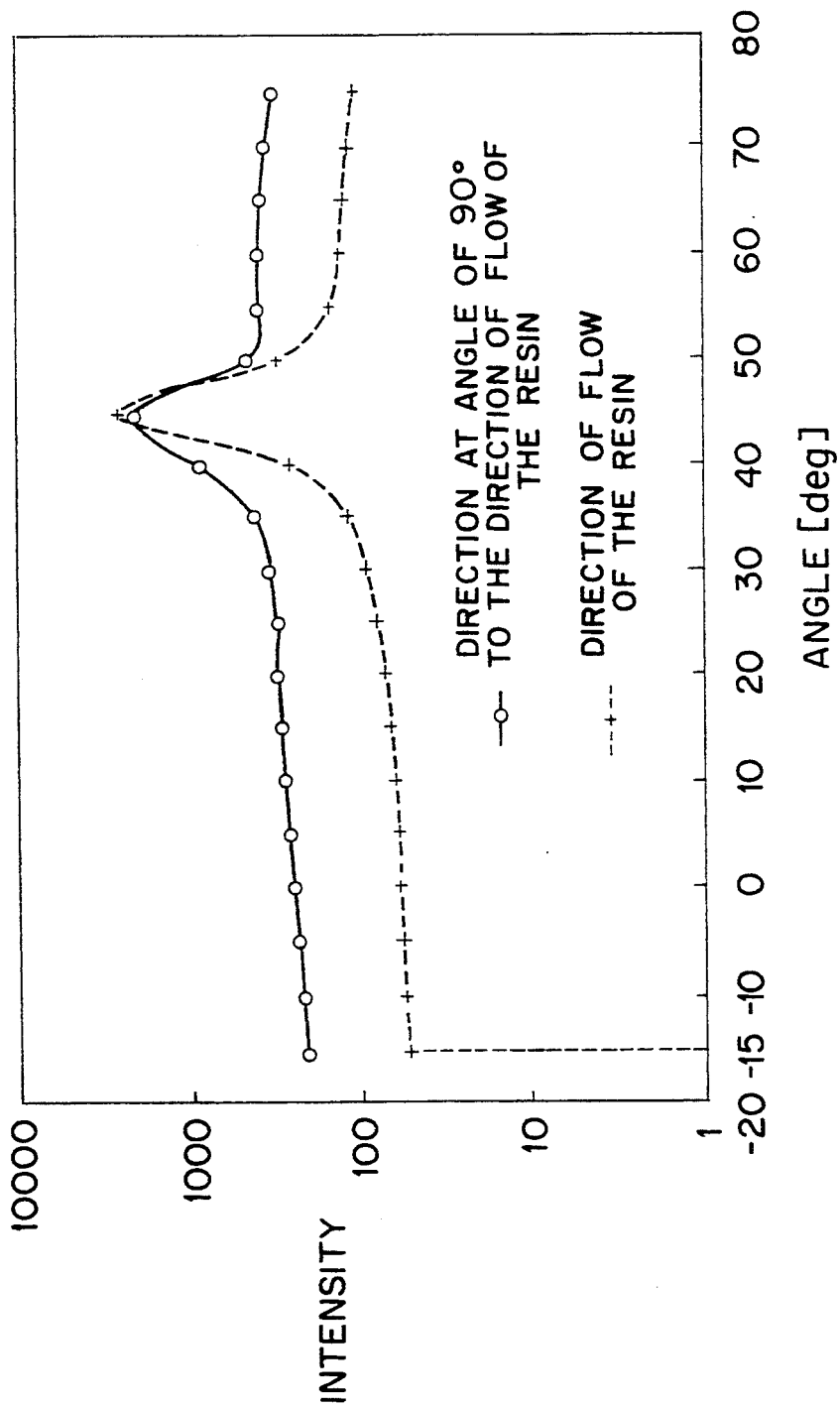

PLASTIC MOLDING HAVING LUSTER AND METHOD OF MOLDING THE SAME

BACKGROUND OF THE INVENTION

1. Field of the Invention

The present invention relates to a plastic molding having an anisotropic, stereoscopically deep luster and a method of molding the same,

2. Description of the Prior Art

In order to impart a special luster to a plastic molding such as a container, a method has hitherto been used wherein a pearlescent pigment containing mica or the like is added to a thermoplastic resin, and a plastic molding having a pearlescent luster has been produced by melt-molding the thermoplastic resin containing a pearlescent pigment added thereto.

In the above method wherein a pearlescent pigment is added, however, changes in the particle diameter and the amount of addition of the pearlescent pigment are substantially the sole means for developing various types of luster. In this method, no molding having an excellent appearance rich in a variation can be produced, and the development of a plastic molding, such as a container, having a better appearance rich in a variation has been desired in the art from the viewpoint of decoration. Further, since the above pearlescent pigment is expensive, the cost is disadvantageously high.

For this reason, a proposal has been made on a method of imparting a special luster to a plastic molding through the utilization of a resin composition comprising resins incompatible with each other. For example, Japanese Patent Publication No. 39336/1986 discloses a resin container produced by molding a resin composition comprising 10 to 99% by weight of a polyester resin and 1 to 90% by weight of a polyolefin resin. In this case, the thin-walled part of the container is unidirectionally oriented and has metallic luster. Further, Japanese Patent Publication No. 24253/1986 discloses a cosmetic bottle made of a plastic having a flow pattern like that of a nimbostratus produced by subjecting a resin mixture comprising 99.5 to 90% by weight of a polyester resin and 0.5 to 10% by weight of a metacrylic resin to stretch blow molding.

Although a plastic molding which has been molded by a conventional method by making use of a resin composition comprising resins incompatible with each other has a beautiful appearance, it has only a metallic luster which is disagreeable for man, which renders it unsuitable as a container for cosmetics or the like required to have a high-gradeness. Further, the above molding has a problem that it has no luster superior to the plastic molding containing a pearlescent pigment. Further, it is difficult to make the above plastic molding having a combination of excellent luster and high impact strength.

SUMMARY OF THE INVENTION

Accordingly, an object of the present invention is to provide a plastic molding having a fine, homogeneous, anisotropic luster and a method of molding the same.

Another object of the present invention is to provide a plastic molding having such a luster that a softness with high-gradeness is further added to the fine, homogeneous anisotropic luster.

A further object of the present invention is to provide a plastic molding having a configuration which can provide a further improved fine, homogeneous, anisotropic luster.

A still further object of the present invention is to provide a plastic molding having a combination of a fine, homogeneous, anisotropic luster with a high impact strength.

The present inventors have conducted extensive and intensive studies and, as a result, have found that the above objects can be attained by a plastic molding having a particular internal structure produced by molding resin composition having particular composition, melt viscosity and storage modulus (this term may be merely referred to as "modulus of elasticity") and that the above objects can be attained also by making use of a molding method wherein resins constituting the above particular resin composition are controlled to have a particular relationship among particular properties under molding Conditions.

The present invention has been made based on the above finding and provides the following plastic moldings having a luster.

A plastic molding having an inner surface and an outer surface produced by molding a resin composition comprising 98 to 50 parts by weight of a thermoplastic polyester resin (A) and 2 to 50 parts by weight of a resin (B) incompatible with the thermoplastic polyester resin, said resin (B) being dispersed in said resin (A), wherein said resin (B) has in an arbitrary layer in the direction of the thickness of said plastic molding a substantially rod form satisfying the requirement represented by the following formulae (1) and the length of the rods (2) and is oriented in parallel to the outer surface of said plastic molding and in the direction of flow of the resin composition in molding:

$$1 \leq P/Q \leq 10 \tag{1}$$

$$(P+Q)/L \leq 0.5 \tag{2}$$

wherein L, P and Q represent the size of the particle of said resin (B) and respectively have the following values:

L: the average length (μm) in the direction of stretching of the particle;

P: the average major axis (μm) in the case where a section perpendicular to the direction of stretching of the particle is approximated to be elliptical; and Q: the average minor axis (μm) in the case where the section perpendicular to the direction of stretching of the particle is approximated to be elliptical.

The above resin composition preferably comprises a combination of the above resin (A) with the above resin (B) capable of satisfying the requirement represented by the following formula (8) or the following formulae (8) and (9)

$$\eta_B/\eta_A < 0.5 \tag{8}$$

$$E_A < E_B \tag{9}$$

wherein, $\eta_A$, $\eta_B$, $E_A$ and $E_B$ respectively have the following values:

$\eta_A$: the melt viscosity of said resin (A) at the temperature and shear rate in injection or extruding;

$\eta_B$: the melt viscosity of said resin (B) at the temperature and shear rate in injection or extruding;

$E_A$: the storage modulus of said resin (A) at the resin temperature in blowing or stretching; and $E_B$: the storage modulus of said resin (B) at the resin temperature in blowing or stretching.

Further, the present invention provides the following molding methods (1), (2) and (3) as a preferred method of molding the above plastic molding according to the present invention.

(1) A method of molding a plastic molding, comprising subjecting a resin composition comprising 98 to 50 parts by weight of a thermoplastic polyester resin (A) and 2 to 50 parts by weight of a resin (B) incompatible with said thermoplastic polyester resin to injection or extrusion molding, wherein the resin temperature and shear rate are controlled in such a manner that the viscosity, $\eta_A$, of said resin (A) and the melt viscosity, $\eta_B$, of said resin (B) have the relationship $\eta_B/\eta_A < 0.5$ in the injection or extrusion molding.

(2) A method of molding a plastic molding, comprising subjecting a resin composition comprising 98 to 50 parts by weight of a thermoplastic polyester resin (A) and 2 to 50 parts by weight of a resin (B) incompatible with said thermoplastic polyester resin to blow molding, wherein the resin temperature and shear rate are controlled in such a manner that the melt viscosity, $\eta_A$, of said resin (A) and the melt viscosity, $\eta_B$, of said resin (B) have the relationship $\eta_B/\eta_A < 0.5$ in the parison molding and the parison temperature is controlled in such a manner that the storage modulus, $E_A$, of said resin (A) and the storage modulus, $E_B$, of said resin (B) have the relationship $E_A < E_B$ in the blowing.

(3) A method of molding a plastic molding comprising subjecting a resin composition comprising 98 to 50 parts by weight of a thermoplastic polyester resin (A) and 2 to 50 parts by weight of a resin (B) incompatible with said thermoplastic polyester resin to injection blow molding, wherein the parison molding is conducted by injection, the shear rate at a gate in said molding being changed in at least two stages on a high shear rate side and a low shear rate side with a shear rate in the range of from $6.0 \times 10^3$ to $9.0 \times 10^3$ (sec$^{-1}$) being the boundary, said injection being conducted while controlling the resin temperature and shear rate in such a manner that the melt viscosity, $\eta_A$, of said resin (A) and the melt viscosity, $\eta_B$, of said resin (B) have the relationship $\eta_B/\eta_A < 0.5$ at least in the shear rate on the high shear rate side, and the parison temperature is controlled in such a manner that the storage modulus, $E_A$, of said resin (A) and the storage modulus, $E_B$, of said resin (B) have the relationship $E_A < E_B$ in the blowing.

BRIEF DESCRIPTION OF THE DRAWINGS

FIG. 4 is a graph showing the relationship between the shear rate at a gate at the resin temperature in injection and the melt viscosity of each resin;

FIG. 5 is a graph showing the relationship between the temperature of a polypropylene resin in blow molding and the measured value of DSC;

FIG. 6 is a graph used for estimating the viscoelasticity of a polypropylene resin at the blow temperature from the results of measurement of the dynamic solid viscoelasticity, dynamic melt viscoelasticity and DSC;

FIG. 8a, FIG. 8b, and FIG. 8c are enlarged schematic views of a cut piece prepared by cutting the plastic molding of the present invention shown in FIG. 15, wherein FIG. 8(a) is a perspective view of the cut piece, FIG. 8(b) is a sectional view of the cut piece shown in FIG. 8(a) showing an incident light and a reflected light in the direction of stretching of the resin (B) in a rod form as viewed from the α side of the section of the cut piece and FIG. 8(c) is a sectional view of the cut piece shown in FIG. 8(a) showing an incident light and a reflected light in the perpendicular direction to the direction of stretching of the resin (B) in a rod form as viewed from the β side of the section of the cut piece;

FIG. 17 is a graph showing the reflected light intensity distribution of a tubular molding which has been produced in Test Example 8 and has a spherical particulate titanium oxide dispersed on the internal surface side of a layer having the above internal structure,

DETAILED DESCRIPTION OF THE INVENTION

Figure 1A:
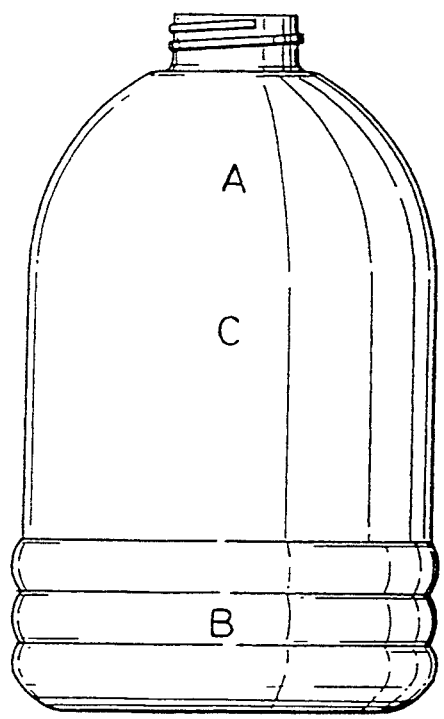
FIG. 1(a) is a side view of an embodiment of the plastic molding according to the present invention.

Description of Plastic Molding of Present Invention

First the plastic molding having a luster according to the present invention will be described in detail.

In the present invention, the above thermoplastic polyester resin (A) (hereinafter referred to as "resin (A)") used in the above resin composition preferably comprises ethylene terephthalate as the major repeating unit, and examples of the resin include ethylene -terephthalate-containing polymers such as polyethylene terephthalate a copolyester comprising terephthalic acid, isophthalic acid and ethylene glycol, a copolyester comprising terephthalic acid, ethylene glycol and 1,4-cyclohexanedimethanol and a copolyester comprising terephthalic acid, isophthalic acid, ethylene glycol and propylene glycol.

The above ethylene-terephthalate-containing polymers may contain, as a comonomer component, 10% by weight or less of at least one member selected from dicarboxylic acids such as succinic acid, adipic acid, azelaic acid, sebacic acid, dodecanoic acid, p-hydroxybenzoic acid and naphthalinedicarboxylic acid and glycol components such as diethylene glycol, propylene glycol, polyethylene glycol, polytetramethylene glycol and naphthalinediol.

The intrinsic viscosity of the resin (A) is preferably in the range of from 0.65 to 1.40, still preferably in the range of from 0.70 to 1.20, particularly preferably in the range of from 0.75 to 1.20. When the intrinsic viscosity is less than 0.65, the impact resistance of the plastic molding is remarkably spoiled and in extrusion molding the drawdown is so significant that it becomes very difficult to conduct molding. On the other hand, when it exceeds 1.40, it becomes very difficult to conduct injection molding or the like.

The molecular weight of the resin (A) is preferably 10,000 to 1,000,000 in terms of weight average molecular weight.

In the present invention, the resin (B) (hereinafter referred to as "resin (B)") incompatible with the resin (A) used in the above resin composition is at least one member selected from the group consisting of a polyolefin resin, a poly(meth)acrylic resin, a polystyrene resin, a polycarbonate resin and a polyamide resin.

Specific examples of the polyolefin resin include olefin resins such as high-density polyethylene, low-density polyethylene, polypropylene, an ethylene/propylene copolymer, an ethylene/propylene/butadiene copolymer, an ethylene/vinyl acetate copolymer, poly-4-methyl-1-pentene, an ethylene/methacrylic acid copolymer and their alkali metal salts, an acid-modified polyethylene, an acid-modified polypropylene and an acid-modified ethylene/vinylacetate copolymer each modified with maleic anhydride or the like and an epoxy-modified polyethylene copolymerized with glycidyl methacrylate or the like. Specific examples of the poly(meth)acrylate include homopolymers of lower alkyl(meth)acrylates such as methyl methacrylate and methyl acrylate (both the compounds being hereinafter collectively referred to as "(meth)acrylate"), ethyl(meth)acrylate and butyl(meth)acrylate and (meth)acrylonitrile, and butyl(meth)acrylic ester copolymers such as copoly(meth)acrylates produced by copolymerizing the above compounds. Specific examples of the polystyrene resin include polystyrene, high impact polystyrene and polymethylstyrene. Specific examples of the polycarbonate resin include bisphenol resins such as poly(oxycarbonyloxybis(1,4-(3,5-dichlorophenylene)), poly(oxycarbonyloxy-1,4-phenylenebutylidene-1,4-phenylene), poly(oxycarbonyloxy-1,4-phenylenecyclohex -ylidene-1,4-phenylene), poly(oxycarbonyloxy-1,4-phenyl -ene-1,3-dimethyl-butylidene-1,4-phenylene), poly(oxy -carbonyloxy-1,4-phenylenediphenylmethylene-1,4-phenylene), poly(oxycarbonyloxy-1,4-phenyleneethylidene-1,4phenylene), poly(oxycarbonyloxy-1,4-phenyleneisobutylidene -1,4-phenylene), poly(oxycarbonyloxy-1,4-phen -yleneisopropylidene-1,4-phenylene), poly(oxycarbony -loxy-1,4-phenylene-1-methylbutylidene-1,4-phenylene) and poly(oxycarbonyloxy-1,4-phenylene-1-propyl -butylidene-1,4-phenylene). Specific examples of the polyamide resin include polyamide resins such as nylon 6, nylon 66and nylon 12. They may be used alone or in combination of two or more of them.

The molecular weight of the resin (B) is preferably 10,000 to 1,000,000 in terms of the weight average molecular weight.

All the above resins (B) exhibit an anisotropic luster when they are combined with the above resin (A). In the present invention, however, it is preferred that the difference in the refractive index at 20° C. between the resin (A) and the resin (B) be 0.05 or more. When the difference is less than 0.05, the anisotropic luster which is a feature of the present invention deteriorates unfavorably. Examples of the combination of the resin (A) with the resin (B) capable of satisfying the above requirement include a combination of polyethylene terephthalate or a copolyester comprising terephthalic acid, ethylene glycol and 1,4-cyclohexanedimethanol or the like as the resin (A) with polyethylene, polypropylene, an ethylene/vinyl acetate copolymer, polymethyl methacrylate or the like as the resin (B).

According to the present invention, the proportions of incorporation of the resin (A) and the resin (B) in the above resin composition should be in the range of from 98 to 50 parts by weight and in the range of from 2 to 50 parts by weight, respectively, preferably in the range of from 95 to 60 parts by weight and 5 to 40 parts by weight, respectively still preferably in the range of from 90 to 70 parts by weight and 10 to 30 parts by weight, respectively. When the proportions are outside the above, no sufficient development of an anisotropic luster, which is a feature of the present invention, can be attained.

In the molding of a molding from the above resin composition, molding may be conducted by feeding a resin composition previously kneaded in a desired composition into a molding machine or feeding a dry-blended resin composition, such as, into a molding machine.

In the present invention, additives, for example, coloring agents such as pigments or dyes, antistatic agents, release agents and nucleating agents, may be added to the above resin composition so far as the anisotropic luster is not spoiled, thereby causing them to be present in the phase of the resin (A) as a matrix phase or the phase of the resin (B) as a dispersed phase.

The plastic molding of the present invention is produced by molding the above resin composition and comprises the resin (A) and, dispersed therein, the resin (B), and has a particular internal structure in arbitrary layer in the direction of the thickness of the plastic molding.

The expression "arbitrary layer in the direction of the thickness of the above plastic molding" used herein is intended to mean an arbitrary position in the direction of the thickness. For example, when the plastic molding has a multi-layer structure comprising a plurality of arranged layers, the layer includes one of the layers constituting the multi-layer structure, while when the plastic molding comprises a single layer, the layer include a part of the layer in the direction of the thickness.

In the plastic molding of the present invention, the term "particular internal structure" is intended to mean such a structure that the resin (B) is in a substantially rod form capable of satisfying the requirement represented by the following formulae (1) and (2) and the length of the rods is oriented in parallel to the outer surface of the plastic molding and in the direction of flow of the resin composition in molding:

$$1 \leq P/Q \leq 10 \qquad (1)$$

$$(P+Q)/L \leq 0.5 \qquad (2)$$

wherein L, P and Q are as defined above (the same shall apply hereinafter).

When the form of the above resin (B) is outside the scope defined by the above formulae (1) and (2), no sufficient anisotropy of luster can be attained, so that the luster characteristic of the present invention becomes poor.

The expression "outer surface of the plastic molding" used herein is intended to mean a surface which can be recognized from the outside of the molding. Further, the expression "oriented in the direction of flow of the resin composition in molding" is intended to mean that it is satisfactory for the resin (B) in a substantially rod form to be oriented in the direction of flow of the resin in melt molding, and the orientation of the whole resin (B) in a substantially rod form in a single direction is not always necessary. For example, the resin (B) in a substantially rod form may be oriented radially from one point. Alternatively, a number of small regions where the resin (B) in a substantially rod form oriented in a single direction may be located adjacent to one another. In this embodiment, individual regions may be oriented in any direction. In these cases, it is possible to provide a characteristic glossiness (lustrousness) different from the case where the whole resin (B) in a substantially rod form is oriented in a single direction.

In the plastic molding having the above internal structure, since the reflection of light is remarkably different in the direction of orientation of the rods of the resin (B) and the direction at angle of 90° to the direction of orientation of the rods of the resin (B), a streak of light extended in the direction at an angle of 90° to the orientation of the rods of the resin (B) is observed around the reflection of a light source in the plastic molding on its surface. Specifically, studies conducted by the present inventors have revealed that in the direction at an angle of 90° to the direction of orientation of the rods of the resin (B) in a substantially rod form, a relatively intense reflection occurs in a wide angle range compared with the direction of orientation of the rods of the resin (B). The anisotropy of such reflected light is considered to provide a stereoscopically deep luster having a high-gradeness unattainable in the prior art. Therefore, the plastic molding having the above internal structure has a unique luster having a high-gradeness best suited for use as bottles for cosmetics, personal care products, etc.

In the plastic molding of the present invention in order to realize a higher anisotropy of luster, it is preferred that, in the rod form of the resin (B), the length, L, of the rod be longer and the form of a section perpendicular to the direction of stretching of the rod be close to a circle and sufficiently smaller than the length, L. Specifically, the form preferably satisfies the requirement represented by the following formulae (1)' and (2)' and still preferably satisfies the following formulae (1)" and (2)":

$$1 \leq P/Q \leq 8 \qquad (1)'$$

$$(P+Q)/L \leq 0.3 \qquad (2)'$$

$$1 \leq P/Q \leq 5 \qquad (1)''$$

$$(P+Q)/L \leq 0.1 \qquad (2)''$$

Basically, the plastic molding emits an anisotropic luster if the above proportions are satisfied. However, the L, P and A values, i.e., the size of the resin (B) in a substantially rod form, are preferably 1 μm or more for the L value and 0.02 to 50 μm for the P and Q values. When these values are outside the above respective ranges, it becomes difficult to attain a sufficiently anisotropic luster.

It will suffice when a part of the layer in the direction of the thickness of the plastic molding has the above internal structure, and in this case, even when the plastic molding is in the form of laminate with other plastic or the like, an anisotropic luster can be obtained without a problem. In this case, however, the layer on the outer surface side of the layer containing the resin (B) in a substantially rod form should be transparent to some extent. Further, the intensity of the anisotropic luster can be controlled by controlling the transparency of the layer on the outer surface side. If the above layer present on the outer surface side is opaque, the anisotropy of the luster becomes unfavorably low.

Examples of the form of the above plastic molding include a rod, a plate, a sheet, a film, a cylinder, a tube, a hollow bottle and their laminates. Further, they may be processed so far as the above internal structure is not lost.

In the plastic molding of the present invention, in order to further enhance the softness of the luster, quiet high-gradeness and lightproofness, it is preferred to further incorporate into the resin composition an inorganic filler preferably in an amount of 0.5% by weight or less, particularly preferably in an amount of 0.05 to 0.3% by weight.

Examples of the inorganic filler include calcium carbonate, titanium oxide, talc and mica, and the mean particle diameter of the filler is preferably 0.02 to 5 μm.

In this case, a better luster can be obtained. Specifically, the graduation effect of the inorganic filler causes the above anisotropic luster to be rendered softer. Further, the luster can be controlled as desired by controlling the amount of addition of the inorganic filler. When the content of the inorganic filler exceeds 0.5% by weight, the anisotropic luster characteristic of the present invention is remarkably spoiled. Further when the content is 0.05 to 0.3% by weight, a suitable graduation effect can be attained. The plastic molding containing an inorganic filler is suitable as a container for cosmetics, personal goods, etc.

In the present invention, in order to further enhance the softness of luster and quiet high-gradeness and lightproofness, it is preferred that the above molding have a layer containing, in a dispersed state, the resin (B) in a substantially spherical form capable of satisfying the requirement represented by the following formula (3) or a layer containing a substantially spherical filler capable of satisfying the requirement represented by the following formula (3) on the inner surface side of the layer containing, in a dispersed state, the resin (B) in a substantially rod form, that is, the layer having the above internal structure:

$$0.25 \leq Q'/L' \quad (3)$$

wherein L' and Q' represent the size of the shape of the resin (B) or filler and respectively have the following values:

L': the average length (μm) of a particle in the direction of stretching; and

Q': the average minor axis (μm) in the case where a section perpendicular to the direction of the direction of stretching of the particle is approximated to be elliptical.

Preferred examples of the filler include inorganic fillers such as calcium carbonate, titanium oxide, talc and mica and organic fillers comprising thermosetting resins and thermoplastic resins. In this case, the amount of use of the filler is preferably 1 to 50% by weight, and both the L' and Q' values are preferably 0.02 to 50 μm.

Since the above layer containing, in a dispersed state, the resin (B) in a substantially spherical form or the layer containing a substantially spherical filler (hereinafter referred to as "layer containing a substantially spherical particle") contains a substantially spherical resin (B) or filler (hereinafter referred to as "substantially spherical particle"), the proportion of a diffused light component (for example, light reflected from the surface of a chalk) in the reflected light is increased, which imparts softness and quietness to the luster and further improves the lightproofness. However, when the substantially spherical particles having the effect of diffusing light (i.e., the effect of reflecting light in an isotropic manner) are present in too large an amount on the outer surface of the layer having the above internal structure, it becomes difficult to obtain an anisotropic luster. For this reason, it is unfavorable if the layer containing a substantially spherical particle is provided on the outer surface side of the layer having the above internal structure. When the above substantially spherical particles are present on the inner surface side of the layer having the above internal structure, the diffused light is simply increased in the background without cutoff of anisotropic reflected light caused by the resin (B) in a substantially rod form on the outer surface side, so that quietness is further imparted to the deep luster.

Further, in the plastic molding of the present invention, in order to further enhance the softness of the luster and the quiet high-gradeness, it is preferred to emboss the plastic molding on its surface.

In this case, uneven portions on the surface of the plastic molding scatter a surface reflected light component contained in the reflected light, so that a quiet luster can be obtained. Examples of the embossing method include molding by making use of a blow or injection mold having an uneven surface formed by sandblasting or the like.

The difference between the plastic molding containing an inorganic additive and the plastic molding having the layer containing a substantially spherical particle resides in that, in the former, the softness is imparted by lowering the anisotropy of the luster while, in the latter, the softness is imparted without lowering the anisotropy of the luster. The actually formed moldings are different from each other in the texture of the luster.

In the present invention, in order to attain a combination of an excellent luster with an excellent impact resistance, in a part of the above plastic molding, the resin (B) has in a layer in the vicinity of the outer surface of the plastic molding a form capable of satisfying the requirement represented by the following formulae (4) and (5) or the following formulae (6) and (7):

$$10 \leq P/Q \leq 20 \quad (4)$$

$$0.1 \leq (P+Q)/L \leq 2 \quad (5)$$

$$1 \leq P/Q \leq 10 \quad (6)$$

$$0.3 \leq (P+Q)/L \leq 2 \quad (7)$$

wherein all the L, P and Q values are preferably 50 μm or less.

The plastic molding of the present invention exhibits an excellent anisotropic luster by virtue of the above internal structure, wherein resin (B) satisfies the requirements of formulae (1) and (2). However, when the above internal structure is present particularly around the surface of the plastic molding, the impact resistance in terms of the drop test number, etc., often becomes insufficient. This is conceivable to be attributable to easy propagation of the failure of interface between the matrix phase and the dispersed phase. This problem is significant particularly when the adhesion of the interface between the resin (A) and the resin (B) is poor or when the plastic molding has a structure having a low impact resistance.

The impact resistance can be improved by changing the form of the resin (B) from rods to a spherical one. In this case, however, the anisotropic luster becomes unsatisfactory.

When the above internal structure, wherein resin (B) satisfies the requirements of formulae (1) and (2), and structure containing the resin (B) having a form capable of satisfying the requirement represented by the formulae (4) and (5) or the formulae (6) and (7) are separately disposed at different positions of the plastic molding, it becomes possible to satisfy both the luster and impact resistance requirements.

Specifically, a plastic molding having satisfactory luster and impact strength can be obtained when the above internal structure, wherein resin (B) satisfies the requirements of formulae (1) and (2), is disposed in the layer in the vicinity of the surface of a portion required to have a luster and a structure containing the resin (B) in a form capable of satisfying the requirement represented by the formulae (4) and (5) or the formulae (6) and (7) is disposed in a layer in the vicinity of the surface of a portion which is liable to cause a failure of the plastic molding due to impact caused by dropping or the like.

When no resin (B) in a form capable of satisfying the requirement represented by the formulae (4) and (5) or the formulae (6) and (7) is contained, the plastic molding is often susceptible to lamellar cracking when it undergoes impact caused by dropping or the like, which is unfavorable in a plastic molding required to have impact resistance from the viewpoint of applications In this case, at least the above internal structure and the structure containing the resin (B) in the above form may be disposed at necessary positions different from each other, and it is unnecessary that the form of the resin (B) in the layer in the vicinity of the surface of other portions satisfy the requirement represented by the formulae (4) and (5) or the formulae (6) and (7).

In the present invention, in order to add a luster having a special pattern to the above excellent luster, it is preferred that, in the plastic molding, among the outlines appearing on plain faces projected or seen through from the directions of three axis orthogonal to one another, the outlines appearing on at least two plain faces have a curved portion and the surfaces corresponding to the curved portion have a three-dimensional curved surface having a radius of 10 to 300 mm.

The term "three-dimensional curved surface" used herein is intended to mean such a surface that a flat film, such as a label, cannot be uniformly stuck to the surface.

As described above, an extended streak of light is observed on both sides of the reflection of a light source in the plastic molding having the internal structure. The provision of the internal structure in the three-dimensional curved surface enables a very mysterious geometric pattern unattainable in the art to be exhibited.

Specifically, under a single light source, a pearlescent luster having a reflected pattern in the form of a single round ring or arc around a reflected image of the light source appears on the three-dimensional curved surface.

On the other hand, under a plurality of light sources, a moiré geometric pattern such that round rings having a pearlescent luster are overlapped and cross each other several times appears on the three-dimensional curved surface.

The moiré pattern is closely related to the internal structure. Specifically, since the resin (B) is in a substantially rod form and exhibits such an anisotropy that the reflected light spreads in a single direction, a plurality of patterns of reflected light appear in a crossed form on a gentle three-dimensional curved surface to form a geometric pattern in such a network form that the patterns of reflected light are overlapped with each other several times. In this case, geometric patterns identical to each other as viewed from any angle of view appear on the three-dimensional curved surface. With movement in the direction of view, the pattern moves to vary the position of an interlaced position of the network, which gives rise to a subtle difference in the appearance, so that a mysterious glossiness (lustrousness) capable of providing a unique stereoscopic appearance is obtained. Further, the intervals of the networks vary depending upon the curvature of the three-dimensional curved surface. Specifically, when the curvature is small, that is, when the radius of the curved surface is large, the network is thick and the intervals are large. On the other hand, when the curvature is small, that is, when the radius of the curved surface is small, the network is thin and the intervals are small, so that the pattern becomes fine.

In the present invention, when the radius of curvature exceeds 300 mm, the intervals of the pattern becomes so large that no difference in the luster is observed between the three-dimensional curved surface and the two-dimensional curved surface, so that no moiré pattern is formed. On the other hand, when the radius of curvature is less than 10 mm, the intervals of the network pattern become so small that the pattern becomes excessively fine, which makes it difficult to distinguish the pattern. Consequently, no moiré pattern is formed unfavorably.

In the present invention, it is preferred that the resin composition comprises a combination of the resins (A) and (B) capable of satisfying the requirement represented by the formula (8) or the formulae (8) and (9) from the viewpoint of providing the internal structure:

$$\eta_B/\eta_A < 0.5 \tag{8}$$

$$E_A < E_B \tag{9}$$

wherein $\eta_A$, $\eta_B$, $E_A$ and $E_B$ are as defined above.

The formula (8) represents a requirement for effectively deforming the resin (B) into a rod form in injection or extrusion molding, and the formula (9) represents a requirement for avoiding a further large deformation of the formed rod resin (B) in blowing or stretching. A plastic molding having an internal structure wherein the resin (B) is in a substantially rod form can be more effectively obtained through a combination of the resins capable of satisfying the above requirement.

When the above requirement is not satisfied, the resin (B) becomes spherical or flaky, so that the plastic molding becomes opaque, lacks distinction and has metallic luster which is of a poor grade.

Description of Method of Molding Plastic Molding of the Present Invention

The method of molding the plastic molding according to the present invention will now be described in detail.

In order to mold the plastic molding of the present invention, it is necessary to use a molding method suitable for a desired form of the plastic molding. Specifically, molding methods such as injection molding, extrusion molding and blow molding are properly applied according to the desired form.

Description of Molding Method (1)

When the plastic molding of the present invention is formed by injection molding or extrusion molding, the resin temperature and the shear rate are controlled in such a manner that the melt viscosity, $\eta_A$, of the resin (A) and the melt viscosity, $\eta_B$, of the resin (B) have the relationship $\eta_B/\eta_A < 0.5$.

The resin temperature is the temperature of the resin in injection or extrusion molding and usually in the range of from 180° to 330° C. The shear rate is one observed at an injection gate or extrusion die slit.

When the resin temperature and the shear rate are controlled so that the above relationship is established, it becomes possible to obtain a plastic molding wherein the resin (B) in a substantially rod form capable of satisfying the requirement represented by the formulae (1) and (2) is oriented in an arbitrary layer of the resultant plastic molding, in the direction of flow of the resin composition in molding. When the $\eta_B/\eta_A$ value is equal to or larger than 0.5, the resin (B) is not in a substantially rod form capable of satisfying the requirement represented by the formulae (1) and (2) but in a form close to a sphere, so that no satisfactory anisotropic luster can be obtained.

The above molding method may further comprise the step of stretching the resin composition, and when the stretching is conducted, it is also possible to control the resin temperature in such a manner that the storage modulus, $E_A$, of the resin (A) and the storage modulus, $E_B$, of the resin (B) have the relationship $E_A < E_B$.

When the relationship $E_A < E_B$ is established, the resin (B) in a substantially rod form formed by injection molding or extrusion molding is not significantly stretched in the direction of the width and can maintain the oriented rod form. When the $E_A$ value is equal to or larger than the $E_B$ value, the rod form formed before stretching becomes flaky and exhibits a metallic luster or the aspect ratio of the resin (B) in a substantially rod form becomes small, so that the anisotropic luster is liable to become poor.

In the step of stretching, the resin composition is stretched in a direction different from the direction of flow of the resin composition. When the resin composition is stretched in the same direction as the direction of flow of the resin composition, the anisotropic luster does not deteriorate even when the elastic modulus requirement is not satisfied. Further, the stretching may or may not have a molecular orientation effect. The step of stretching may be conducted immediately after injection or extrusion molding or after reheating of injection- or extrusion-molded article as cooled. The stretching temperature is usually in the range of from 80° to 250° C.

Specific examples of the injection molding or extrusion molding method include injection molding, co-injection molding (sandwich molding, two-color molding, etc.), extrusion molding and co-extrusion molding such as inflation method and T-die method, laminate molding and pipe molding. The step of stretching may be added to the above molding methods. Further, it is also possible to conduct processing after the molding, so far as the above structure is not spoiled.

Examples of the form of the plastic molding obtained by the injection molding or extrusion molding include a rod, a plate, a sheet, a film, a pipe, a tube, a cup or a bag, and they may have a single-layer or multi-layer structure.

Description of Molding Method (2)

When the plastic molding of the present invention is formed by blow molding, the resin temperature and the shear rate are controlled in such a manner that the melt viscosity, $\eta_A$, of the resin (A) and the melt viscosity, $\eta_B$, of the resin (B) have the relationship $\eta_B/\eta_A < 0.5$ in the parison molding and the parison temperature is controlled in such a manner that the storage modulus, $E_A$, of the resin (A) and the storage modulus, $E_B$, of the resin (B) have the relationship $E_A < E_B$ in blowing.

The blow molding is preferably injection blow molding or extrusion blow molding. The injection blow molding method may be any of a hot parison method and a cold parison method. They may or may not have a molecular orientation effect. Further, use may be made of multi-layer molding which utilizes co-injection or co-extrusion.

When plastic molding is formed by blow molding, a parison (a parison formed by injection molding and a parison formed by extrusion molding being hereinafter referred to as "injected parison" and "extruded parison", respectively, and when both molding methods are involved, the formed parison being hereinafter referred to simply as "parison") is first formed by injection or extrusion. In order that the finally formed plastic moldings have an anisotropic luster, a layer wherein the resin (B) in a substantially rod form capable of satisfying the requirement represented by the formulae (1) and (2) is oriented in the above manner should be provided in the parison.

In order to form a layer having an oriented rod structure in the parison, it is necessary that the melt viscosity, $\eta_A$, of the resin (A) and the melt viscosity, $\eta_B$, of the resin (B) have the relationship $\eta_B/\eta_A < 0.5$ in the parison molding (usually at 180° to 330° C.). When $\eta_B/\eta_A$ value is equal to or larger than 0.5, the resin (B) is not in substantially rod form capable of satisfying the requirement represented by the formulae (1) and (2) but in a form close to a spherical one, so that no satisfactory anisotropic luster can be obtained.

In blow molding, the storage modulus, $E_A$, of the resin (A) and the storage modulus, $E_B$, of the resin (B) at the parison temperature (usually 80° to 250° C.) should have the relationship $E_A < E_B$. Although the resin (B) in a substantially rod form dispersed in the parison also undergoes a stretching force in blow molding as a result, the resin (B) in a substantially rod form is not significantly stretched in the direction of the width and can maintain the oriented rod form, if the requirement represented by the formula $E_A < E_B$ is satisfied at the blow molding temperature. When the $E_A$ is equal to or larger than $E_B$, the resin (B) in a rod form formed before blowing becomes spherical or flaky and exhibits a metallic luster and reduces the aspect ratio of the resin (B) in a substantially rod form, so that the anisotropic luster deteriorates.

In blow molding, the plastic molding is provided in the form of a container such as a hollow bottle.

Description of Molding Method (3)

Although the plastic molding formed by blow molding, such as a bottle, has an excellent anisotropic luster, the impact resistance often becomes poor when the internal structure, wherein resin (B) satisfies the requirements of formulae (1) and (2), is present in the vicinity of the surface.

The following method is adopted for the purpose of forming a plastic molding having a combination of an excellent anisotropic luster with a high impact strength through the provision of a structure capable of imparting an excellent anisotropic luster at a site required to have a luster and the provision of a structure capable of imparting a high impact strength at a site required to have a high impact strength.

A method of molding a plastic molding, comprising subjecting the above resin composition to injection blow molding, wherein the parison molding is conducted in such a manner that the shear rate at a gate in the parison molding is changed over in at least two stages on a high shear rate side and a low shear rate side with a shear rate in a specific range being the boundary, injection for forming a parison is conducted in such a manner that a particular relationship is established between the resin (A) and the resin (B) at a shear rate on the high shear rate side and the parison temperature is regulated in such a manner that a particular relationship is established between the resin (A) and the resin (B) in blowing.

In order to form the above plastic molding having a combination of an excellent anisotropic luster with a high impact strength, it is necessary to use an injection blow molding method.

The particular range for selecting a shear rate as the boundary is from $6.0 \times 10^3$ to $9.0 \times 10^3$ (sec$^{-1}$). When the shear rate is outside this range, either anisotropic luster or impact strength becomes unsatisfactory.

The term "shear rate on the high shear rate side" is intended to mean a shear rate which is higher than the shear rate as the boundary value and used for molding a site required to have a luster. On the other hand, the term "shear rate on the low shear rate side" is intended to mean a shear rate which is lower than the shear rate as the boundary value and used for molding a site required to have an impact strength.

The expression "particular relationship established on the shear rate at least on the high shear rate side between the resin (A) and the resin (B)" is intended to mean that the melt viscosity, $\eta_A$, of the resin (A) and the melt viscosity, $\eta_B$, of the resin (B) have the relationship $\eta_B/\eta_A < 0.5$ at the resin temperature and shear rate at that time. When the $\eta_B/\eta_A$ value is equal to or larger than 0.5, it becomes very difficult to render the form of the resin (B) to be rods.

When, the shear rate on the low shear rate side is $6.0 \times 10^3$ (sec$^{-1}$) or more, it is preferred that the melt viscosity, $\eta_A$, of the resin (A) and the melt viscosity, $\eta_B$, of the resin (B) have the relationship $\eta_B/\eta_A < 0.5$ at the resin temperature and shear rate at that time. In this case, it is possible to impart, in addition to impact strength, an anisotropic luster to some extent.

In the above shear rate on the high shear rate side, the higher the shear rate, the better the anisotropic luster of the molding. In this case, the upper limit of the shear rate is preferably $1 \times 10^7$ (sec$^{-1}$), particularly preferably $1 \times 10^6$ (sec$^{-1}$).

When the injection is conducted at an excessively low rate for the purpose of lowering the shear rate in the injection at a portion corresponding to a site required to have an impact resistance, it becomes difficult to conduct blow molding even when the temperature is controlled with care. For this reason, the lower limit is preferably $1 \times 10^2$ (sec$^{-1}$) although it varies depending upon the molding machine, injection parison mold, resin, etc.

In the present invention, the shear rate, S, is expressed by the following equation:

$$S = (4V/\pi.t.\gamma^3)$$

wherein V (mm$^3$) represents the one shoot volume of the resin in the injection, t (sec) represents the period of time taken for the resin whose volume is V to be injected and $\gamma$ (mm) represents the radius of the gate. When one injection step comprises several stages different from each other in the shear rate, it is necessary to determine the shear rate from the shoot volume of the resin and the period of time taken for the practice of each stage of the injection.

Examples of the method of molding one injection parison at different shear rates include one wherein the flow rate of the resin is successively varied to vary the shear rate. In addition, when a plurality of gates are used in the injection, it is possible to use a method for molding the resin pertinently in each passage through which the resin flows or a method wherein a plurality of injection units are used.

The expression "particular relationship between the resin (A) and the resin (B) in the blowing" is intended to mean that the storage modulus, $E_A$, of the resin (A) and the storage modulus, $E_B$, of the resin (B) have the relationship $E_A < E_B$. When this requirement is satisfied, the resin (B) in a substantially rod form dispersed in the injection parison at its site required to have a luster is not significantly stretched in the direction of the width and can maintain the oriented rod form. When the $E_A$ value is equal to or larger than the $E_B$ value, the resin (B) in a rod form formed before blow stretching becomes flaky and exhibits a metallic luster, or the aspect ratio of the resin (B) in a substantially rod form becomes small, so that the anisotropic luster is liable to become poor.

In the above molding methods (1) to (3), examples of the method of forming a layer containing substantially spherical particles on the inner side of the layer containing the resin (B) in a substantially rod form include the following two.

In the first method, use is made of an injection molding or extrusion molding method, and this method is applied to the case where no step of stretching is provided and a molding having a thickness of 1 mm or more is formed, or the case where the wall thickness of the precursor prior to the step of stretching or the parison in the blow molding is 1 mm or more. In the molding formed under the above condition, a layer containing, in a dispersed state, substantially spherical particles comprising the resin (B) can be formed without use of any special molding method such as multi-layer molding. When the wall thickness is 1 mm or less, it becomes difficult to form substantially spherical particles.

In the second method, use is made of a multi-layer molding method such as co-injection, co-extrusion or laminate molding. In this method, it is possible to form a multi-layer molding having a layer containing, in a dispersed state, the resin (B) in a substantially rod form and a layer containing in a dispersed state, substantially spherical particles.

In the above molding methods (1) to (3), the mean diameter of the dispersed particle of the resin (B) in the resin composition in a plasticized state in a molding machine immediately before molding is preferably 0.1 $\mu$m or more.

When the method includes the step of stretching or the step of blow molding, the mean diameter of the dispersed particle of the resin (B) in the resin composition in a plasticized state in a molding machine immediately before molding is 0.1 to less than 10 $\mu$m, preferably 0.1 to less than 5 $\mu$m, still preferably 0.1 to less than 2 $\mu$m. When the mean diameter is less than 0.1 $\mu$m, it is difficult to form the resin (B) in a substantially rod form. On the other hand, when the mean diameter exceeds 10 $\mu$m, there is a tendency that, in the resin (B) in a rod form formed by injection or extrusion molding, the area of a section at an angle of 90° to the direction of the length becomes large. When the resin (B) is in such a form, the resin (B) in a rod form is stretched into a flaky form by stretching or blow molding even though the storage modulus satisfies the above requirement. As a result, the resultant plastic molding is liable to exhibit a metallic luster, so that it becomes difficult to obtain an anisotropic luster contemplated in the present invention. When molding is conducted by a method which does not include the step of stretching or blowing, no problem occurs in obtaining an anisotropic luster contemplated in the present invention even when the mean particle diameter exceeds 10 $\mu$m.

The plastic molding according to the present invention is suitable for use as articles required to have an excellent appearance for the purpose of promoting sales, such as the following articles, or as a container for such articles.

Examples of such articles include moldings such as a hair brush, a comb and a handle for a toothbrush; squeeze tube containers for pasty contents such as a tooth powder and a cleansing cream; wrapping paper and ribbon; films for pillow-type package or standing pouch for powdery, liquid or pasty contents; and hollow containers such as bottles for various skin lotions such as a moisture lotion, a massage lotion, a skin lotion, a cleansing lotion, an emollient lotion and a baby oil, various skin creams such as a makeup base cream, a vanishing cream and an emollient cream, various face care, skin care, body care and makeup cosmetics such as a liquid foundation and a creamy foundation, a shampoo, a rinse, a hair conditioner, body care and hand care goods, a liquid detergent for clothes, a mold killer, a glass cleaner, a bleaching agent, a softener, a sizing agent, a detergent for tableware, a cleanser, various detergents for house, and further foodstuffs and medicines.

DETAILED DESCRIPTION OF THE EMBODIMENTS

The present invention will now be described in more detail, though it is not limited to these Examples.

Plastic moldings of Test Examples 1 to 30 were produced from the resin compositions specified in Table 1 to Table 3. Molding methods and forms of moldings, etc., are as follows. Resins used are listed in Table 4.

Resin compositions were used in the form of a pellet produced by preparing resin compositions according to the formulations specified in Table 1 to Table 3 on a twin-screw extruder and pelletizing the resin compositions. Kneading was conducted under the conditions of a cylinder temperature of about 280° C.

Test Examples 1 to 3

Each resin composition listed in Table 1 was molded at a resin temperature of 280° C. into a plate molding on an injection molding machine (J75E-D manufactured by The Japan Steel Works, Ltd.). The resultant molding had a size of a length of 12 cm, a width of 4 cm and a thickness of 3 mm.

Test Examples 4 to 7

Each resin composition listed in Table 1 was molded at respective resin temperatures specified in Table 1 into a filmy molding having a thickness of 0.06 to 0.08 mm on a film molding machine (Labo Plastomill (30C150) manufactured by Toyo Seiki Seisakusho, Ltd. and used with a twin-screw extruder (2D25S) and a T die (T120C) being mounted thereon).

Test Example 8

A tubular molding having an outer diameter of about 35 mm and a thickness of about 0.4 mm and a double-layer structure comprising an outer layer comprised of PETG and PP and an internal layer comprised of PETG and titanium oxide added thereto was formed by molding on a tube molding machine (manufactured by MAC International Associates Co., Ltd. and provided with an extruder MAC-EX38-24-2 and an extruding head MAC-5S-M-80). The thickness ratio of the outer layer to the inner layer was about 1:1.

Test Examples 9 to 27

Figure 1B:
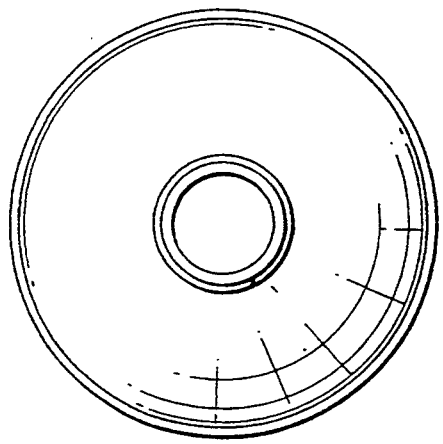
FIG. 1(b) is a plan view of an embodiment of the plastic molding according to the present invention.
Figure 2A:
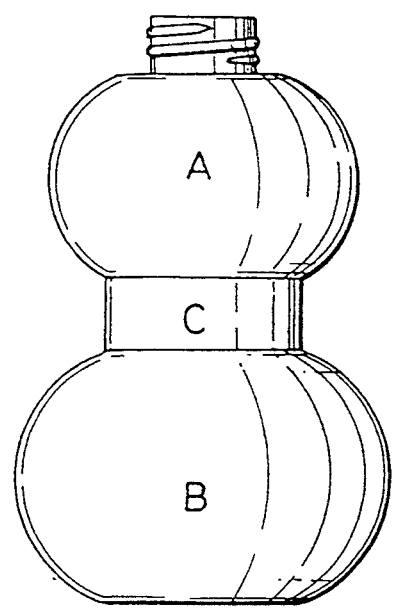
FIG. 2(a) is a side view of another embodiment of the plastic molding according to the present invention.
Figure 2B:
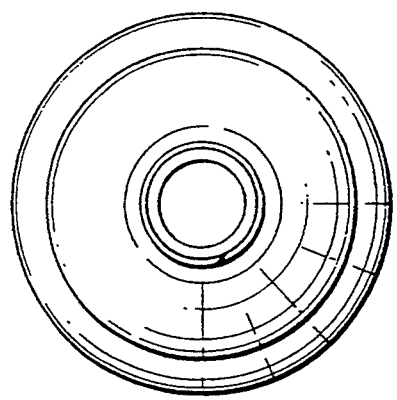
FIG. 2(b) is a plan view of another embodiment of the plastic molding according to the present invention.
Figure 3A:
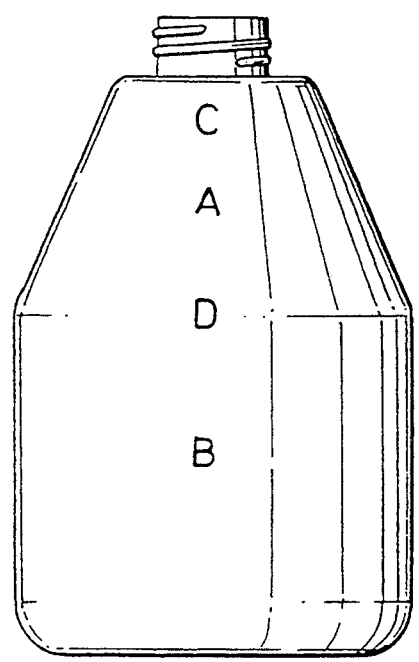
FIG. 3(a) is a side view of a still other embodiment of the plastic molding according to the present invention.
Figure 3B:
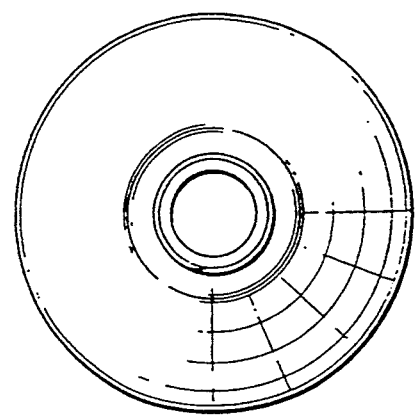
FIG. 3(b) is a plan view of a still other embodiment of the plastic molding according to the present invention.

Each resin composition listed in Table 1 to Table 3 was molded at a resin temperature of 280° C. into a closed-end parison, and the closed-end parisons were subjected to blow molding at respective temperatures to form moldings in a bottle form on an injection stretch-blow molding machine (ASB50MH manufactured by Nissei ASB K.K.) a hot parison method. The molding process in this molding machine was conducted in the following order: (1) injection molding stage (injection molding of parison), (2) temperature regulation stage (regulation of parison temperature), (3) stretch-blow stage (blow molding into bottle) and (4) withdrawal stage. In this molding, three types of bottles, i.e., bottle I, bottle II and bottle III were obtained. The bottle I, bottle II and bottle III are shown in FIG. 1, FIG. 2 and FIG. 3, respectively.

Test Examples 28 and 29

Resin compositions listed in Table 3 were molded respectively into three-layered bottles comprising two kinds of resins as given in Table 3 on the same injection stretch-blow molding machine as that used in Test Examples 9 to 27. The thickness ratio of the outer layer to the intermediate layer to the inner layer was regulated to about 1.5:7:1.5 for Test Example 28 and about 4:2:4 for Test Example 29.

Test Example 30

A resin composition listed in Table 3 was molded into a molding in a bottle form on an extrusion blow molding machine (BMO4D manufactured by Bekum K. K.) at a resin temperature of 220° C. in extruding and a resin temperature of 100° C. in blowing.

Test Example 31

The resin composition, which was specified in Table 1 and the same as that used in Test Example 9, was molded on the same injection stretch-blow molding machine as that used, in Test Example 9, except that use was made of a blow mold subjected to sandblasting (grain size: #80).

The melt viscosity, storage modulus and anisotropy of luster were measured by the following methods. The results are given in Table 1 to Table 3.

Measurement of Melt Viscosity

The melt viscosity was measured under the following conditions. The results of measurement of the melt viscosities of PET (1), LDPE (1) and PMMA (1) specified in Table 4 are given in FIG. 4.
Measuring device: Capirogragh 1B manufactured by Toyo Seiki Seisaku Sho, Ltd.,
Measuring temperature: resin temperature in injection or extrusion,
Shear rate: shear rate in molding.

Measurement of Storage Modulus

1. In the case of noncrystalline resin:
(a) The storage modulus of the solid region (at a temperature below the glass transition temperature) was measured under the following conditions.
Dynamic solid viscoelasticity measuring device: RSA2 manufactured by Rheometrix Corp.,
Measuring temperature: resin temperature in stretching or blow molding.
Frequency: 1 Hz.
(b) Molten region (at a temperature not below the glass transition temperature)
Dynamic melt viscoelasticity measuring device: RDS7700 manufactured by Rheometrix Corp.,
Measuring temperature: resin temperature in stretching or blow molding,
Angular velocity: 0.1 rad/sec.
2. In the case of crystalline resin:
When the resin is crystalline, the storage modulus greatly varies depending upon whether the resin is in a crystallized state (a solid) or a noncrystalline state (a melt) and has an influence on the dispersion structure within the molding. Specifically, in the case of a crystalline resin having a melting point near the stretching or blow temperature (for example, an olefin resin), the conventional dynamic solid viscoelasticity measuring method causes an increase in the storage modulus due to an influence of the crystallization, so that the measured value of storage modulus is larger than the actual storage modulus of the resin in molding.

For this reason, as is apparent from the following description, the storage modulus was estimated by taking into consideration the results of measurement of crystallization by DSC and the measured values of dynamic melt viscoelasticity. In fact, the estimated value can be applied as the storage modulus to the molding without any problem.

A graph showing the relationship between the temperature and the measured value of DSC of the propylene resin is shown in FIG. 5 as typical example of the relationship between the DSC measurement and the stretching or blow temperature. A graph for estimating the storage modulus at each stretching or blow temperature from the results of measurement of the dynamic solid viscoelasticity, the dynamic melt viscoelasticity and the DSC with respect to the same polypropylene resin as that used in FIG. 5 is shown in FIG. 6.

(a) In the case of a molding method wherein stretching is conducted immediately after injection or extrusion, an injection blow molding method wherein a hot parison is used, or an extrusion blow molding method:

In the above molding method, the resin is cooled from a completely molten state immediately before stretching or blowing. Therefore, the DSC measurement was conducted by setting a sample and cooling the sample from a molten state having a temperature above the melting point at a temperature fall rate of 50° C./min.

When an exothermic peak in the crystallization exists on the side of a lower temperature than the stretching or blow temperature (that is, when the stretching or blow temperature is temperature A shown in FIG. 5), the precursor or parison is conceivable to be in a noncrystalline state during stretching or blowing. Therefore the measured value of melt viscoelasticity was tripled (according to triple rule: $E^* = 3G^*$ wherein $E^*$ represents the complex modulus determined by measuring the simple elongation and $G^*$ represents the complex modulus determined by measuring the simple shear) and the value determined by extrapolation to the stretching or blow temperature was regarded as the storage modulus (storage modulus A from the stretching or blow temperature A in FIG. 6).

When an exothermic peak in the crystallization is slightly above or overlaps the stretching or blow temperature (that is, when the stretching or blow temperature is temperature B shown in FIG. 5), it is conceivable that the crystallization may advance during molding and the storage modulus may be increased, the value determined by measuring the dynamic solid viscoelasticity was regarded as the storage modulus (storage modulus B from the stretching or blow temperature B in FIG. 6).

The DSC was conducted under the following conditions.

Measuring device: SSC/5200 manufactured by Seiko Instruments Inc.,
Temperature fall rate: 50° C./min.

When the melting point and crystallization temperature was sufficiently above the stretching or blow temperature (for example, in the case of a polyester resin, etc.), the measurement was conducted by using a solid sample in a noncrystalline state with a dynamic solid viscoelasticity measuring device under the same condition as that used in the case of the noncrystalline resin (1).

Figure 7:
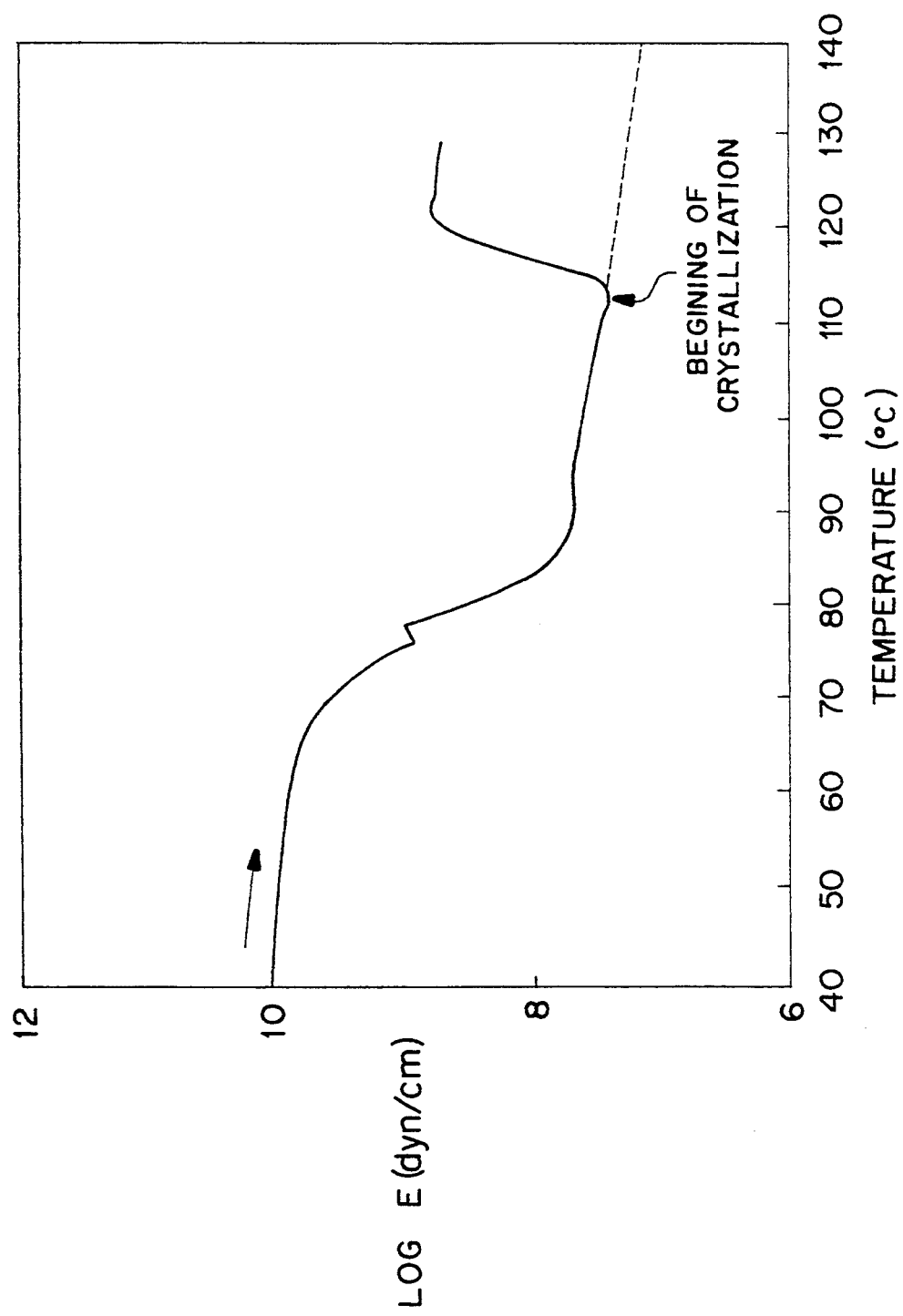
FIG. 7 is a graph showing the relationship between the temperature and the storage modulus in the measurement of the dynamic viscoelasticity of PET.

The relationship between the temperature and the storage modulus as determined by measuring the dynamic viscoelasticity of PET is shown as an example in FIG. 7. The storage modulus at a temperature above about 110° C. is determined on the assumption that it is on a dotted line in FIG. 7.

(b) In the case of a molding method wherein a precursor cooled after injection or extrusion is reheated and stretched, or an injection blow molding method wherein a cold parison is used:

In the case of the above molding method, since the precursor or parison cooled to room temperature is again heated to the stretching or blow temperature, crystallization proceeds when the stretching or blow temperature is below the melting temperature. For this reason, the measured value of the dynamic solid viscoelasticity is regarded as the storage modulus (the measuring condition being the same as the one in the case of the noncrystalline resin (a)). When the stretching or blow temperature is equal to the melting temperature or above, no crystallization occurs, so that the measured value of dynamic melt viscoelasticity is regarded as the storage modulus (the measuring conditions being the same as the one in the case of the noncrystalline resin (b)).

As described above, with regard to the storage modulus of the crystalline resin, sufficient studies should be conducted on whether or not the crystallization occurs at the stretching or blow temperature even when any molding method is used.

Measurement of Anisotropy of Luster

At the outset, the principle of occurrence of anisotropy of luster will be described.

Figure 15:
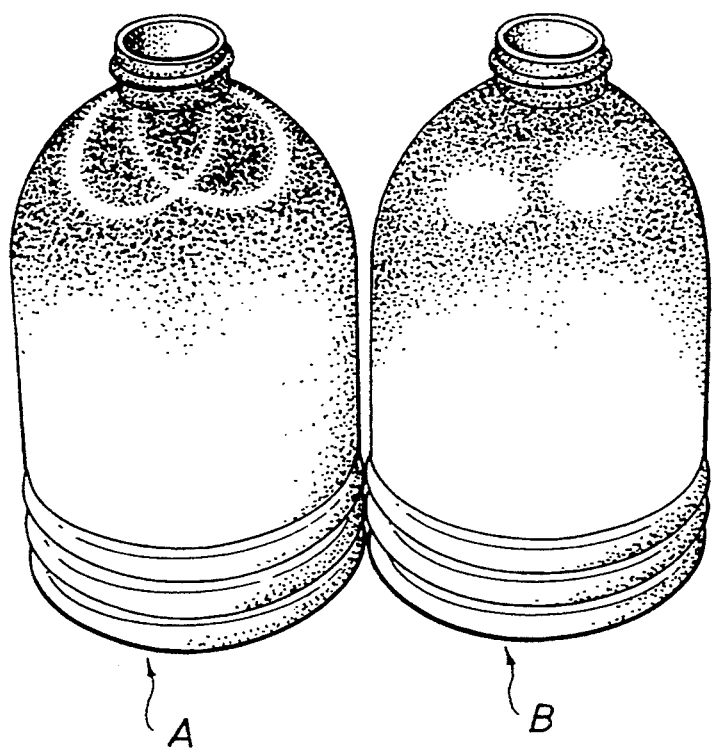
FIG. 15 is a copy of a photograph showing a comparison of the plastic molding of the present invention produced in Test Example 9 with the conventional plastic molding produced in Test Example 26.

FIG. 15 is copy of a photograph showing a comparison of the plastic molding of the present invention produced in Test Example 9 with the conventional plastic molding produced in Test Example 26. In FIG. 15, A refers to the plastic molding of the present invention, and B refers to the conventional plastic molding.

Figure 8A:
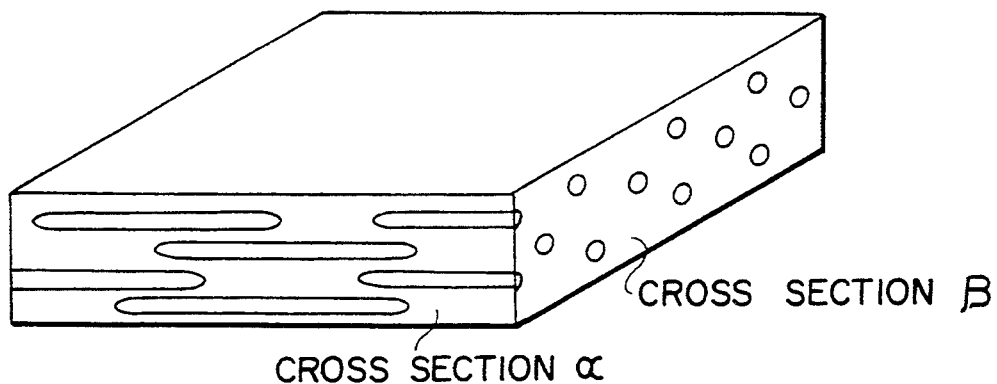
Figure 8B:
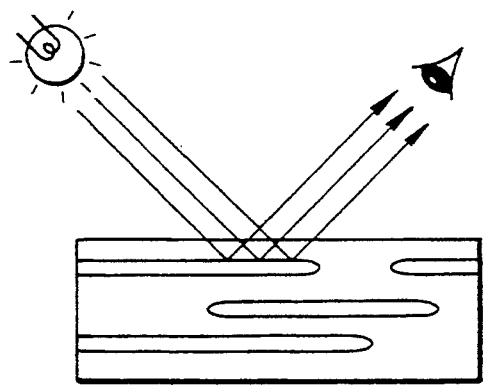
Figure 8C:
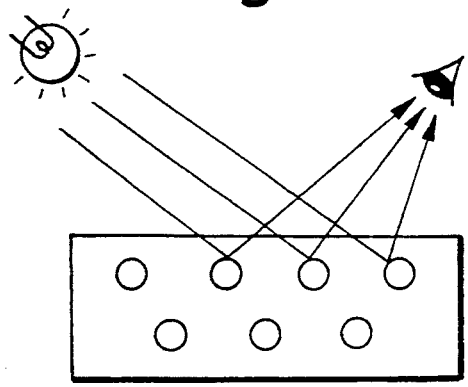
Figure 9:
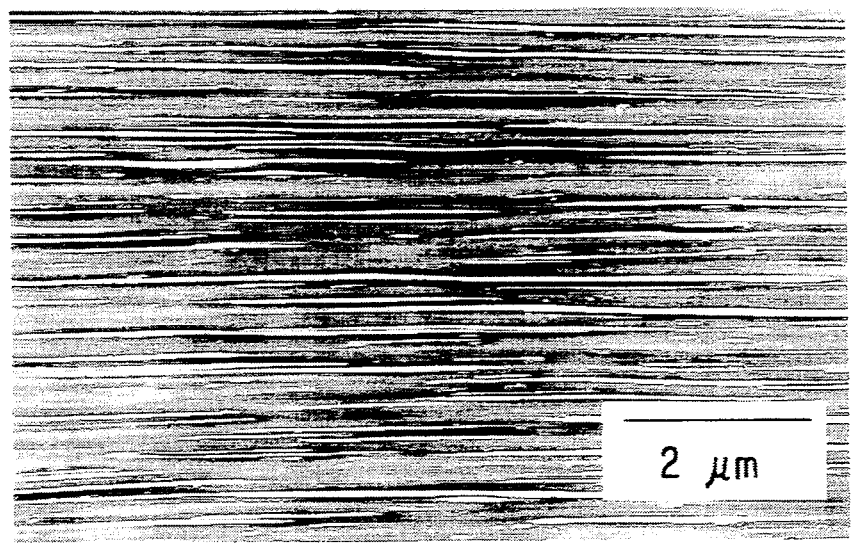
FIG. 9 is a copy of a transmission electron photomicrograph of a resin composition in its section in the direction of flow (corresponding to the section α in FIG. 8(a)) in the molding of the plastic molding of the present invention shown in FIG. 15.
Figure 10:
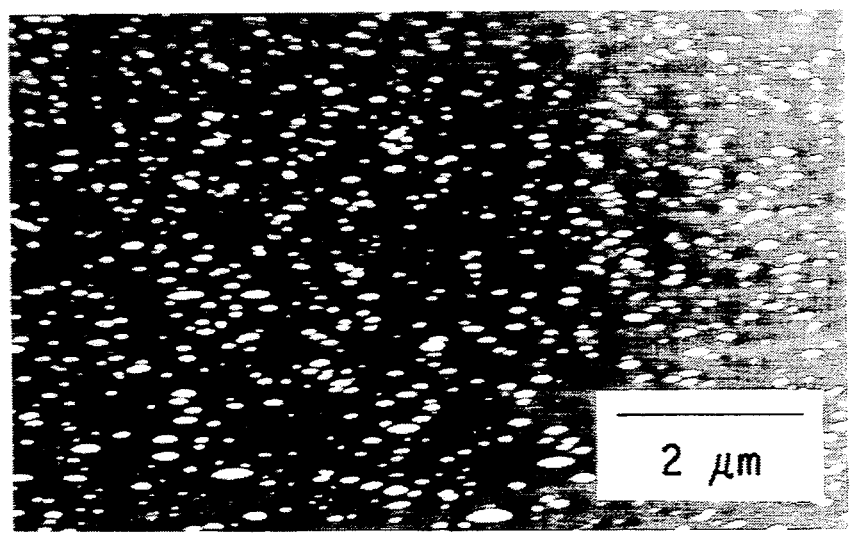
FIG. 10 is a copy of a transmission electron photomicrograph of a resin composition in its section in a direction at an angle of 90° to the direction of flow (corresponding to the section β in FIG. 8(a)) in the molding of the plastic molding of the present invention shown in FIG. 15.

FIG. 8 is an enlarged schematic view of a cut piece prepared by cutting the plastic molding of the present invention shown in FIG. 15, wherein FIG. 8(a) is a perspective view of the cut piece. As shown in FIG. 8(a), the plastic molding of the present invention has such a structure that a resin in a rod form is monodirectionally oriented and dispersed in the matrix. Further, in the plastic molding of the present invention shown in FIG. 15, the transmission electron photomicrographs of a section corresponding to the structure shown in FIG. 8(a) are shown in FIGS. 9 and 10. The incidence of light in a molding having a structure shown in FIG. 8(a) followed by the reflection of the light from the molding will now be studied by taking two models as an example. In the incidence and reflection of light in the direction of stretching of the resin in a rod form (see FIG. 8(b)), since the interface between the matrix phase and the dispersed phase is always parallel to the outer surface of the molding, the light penetrated into the molding is reflected only in a direction capable of satisfying a requirement of the incident angle being equal to the angle of reflection to the surface of the molding. On the other hand, in a direction perpendicular to the direction of stretching of the rod (see FIG. 8(c)), since the interface between the matrix phase and the dispersed phase can take any angle to the surface of the molding, the light penetrated into the matrix is reflected in various directions. This gives rise to the anisotropy of luster.

Figure 11:
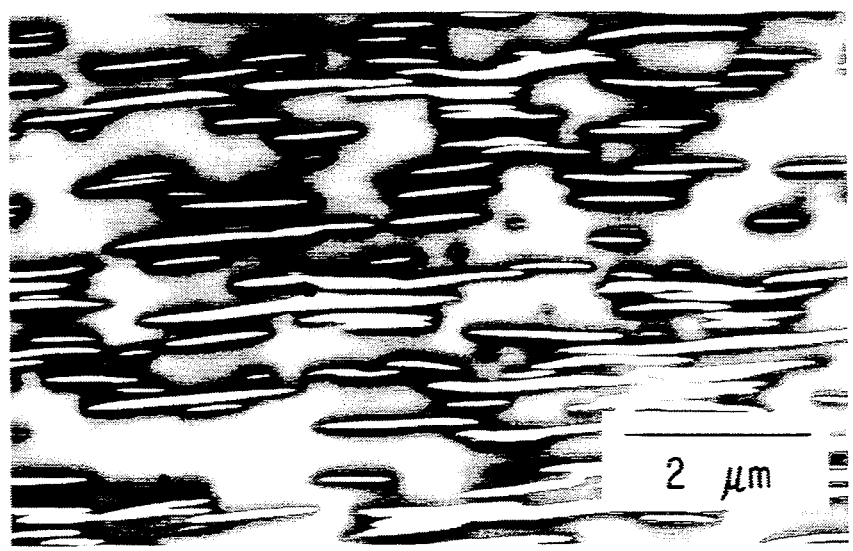
FIG. 11 is a copy of a transmission electron photomicrograph of a resin composition in its section in the direction of flow (corresponding to the section α in FIG. 8(a)) in the molding of the conventional plastic molding shown in FIG. 15.
Figure 12:
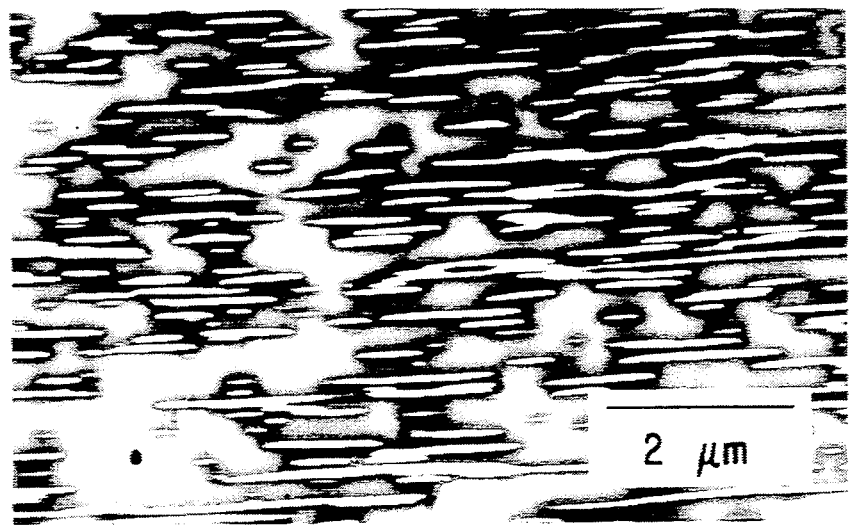
FIG. 12 is a copy of a transmission electron photomicrograph of a resin composition in its section in a direction at an angle of 90° to the direction of flow (corresponding to the section β in FIG. 8(a)) in the molding of the conventional plastic molding shown in FIG. 15.

On the other hand, as is apparent form the transmission electron photomicrographs shown in FIGS. 11 and 12, the internal structure of the conventional molding having a metallic luster is merely such that flaky particles having no anisotropy are dispersed.

A measurement was conducted under the following conditions in order to represent the anisotropy of luster numerically.

Figure 13:
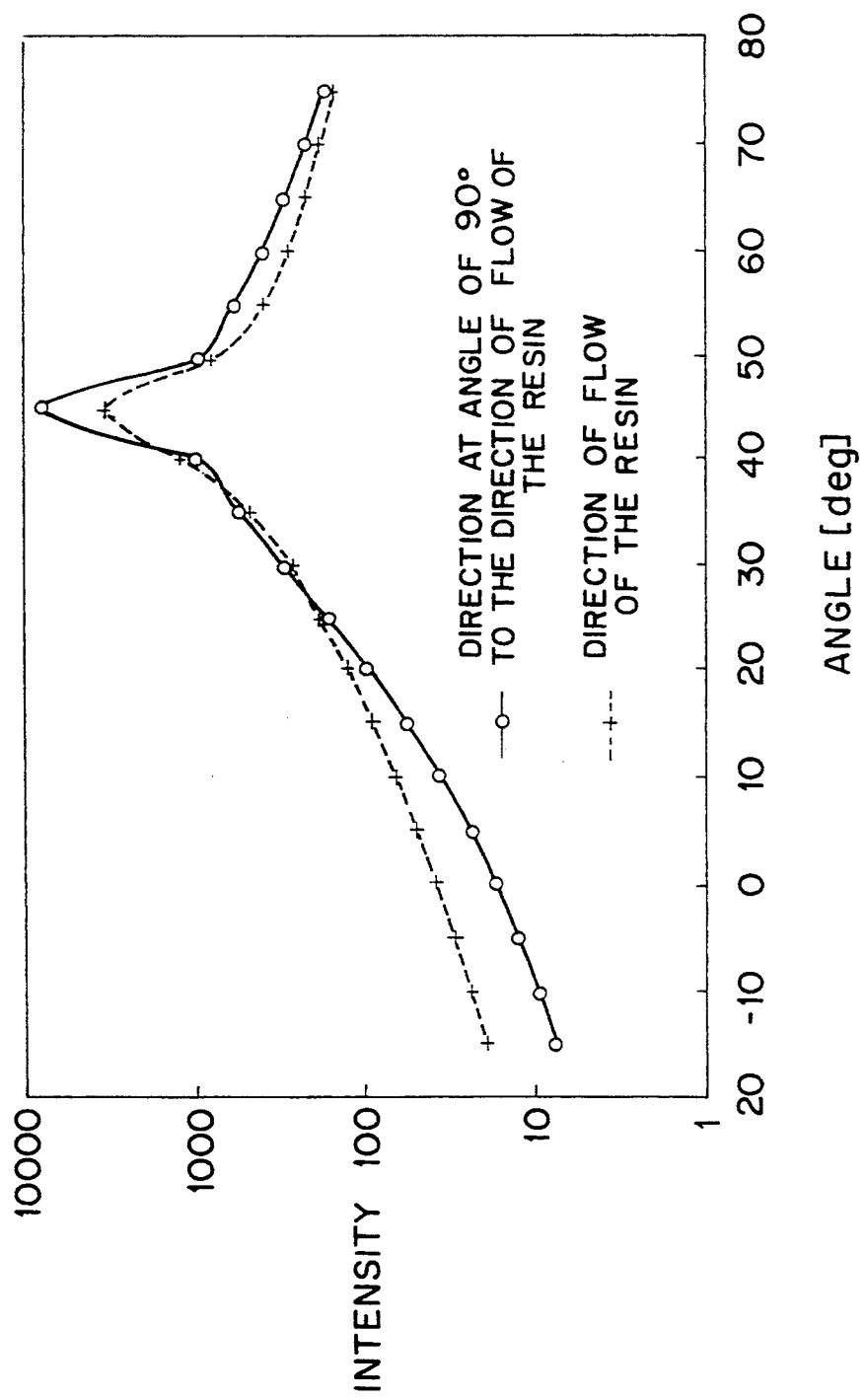
FIG. 13 is a graph showing the reflected light intensity distribution of a conventional plastic molding produced in Test Example 26.
Figure 14:
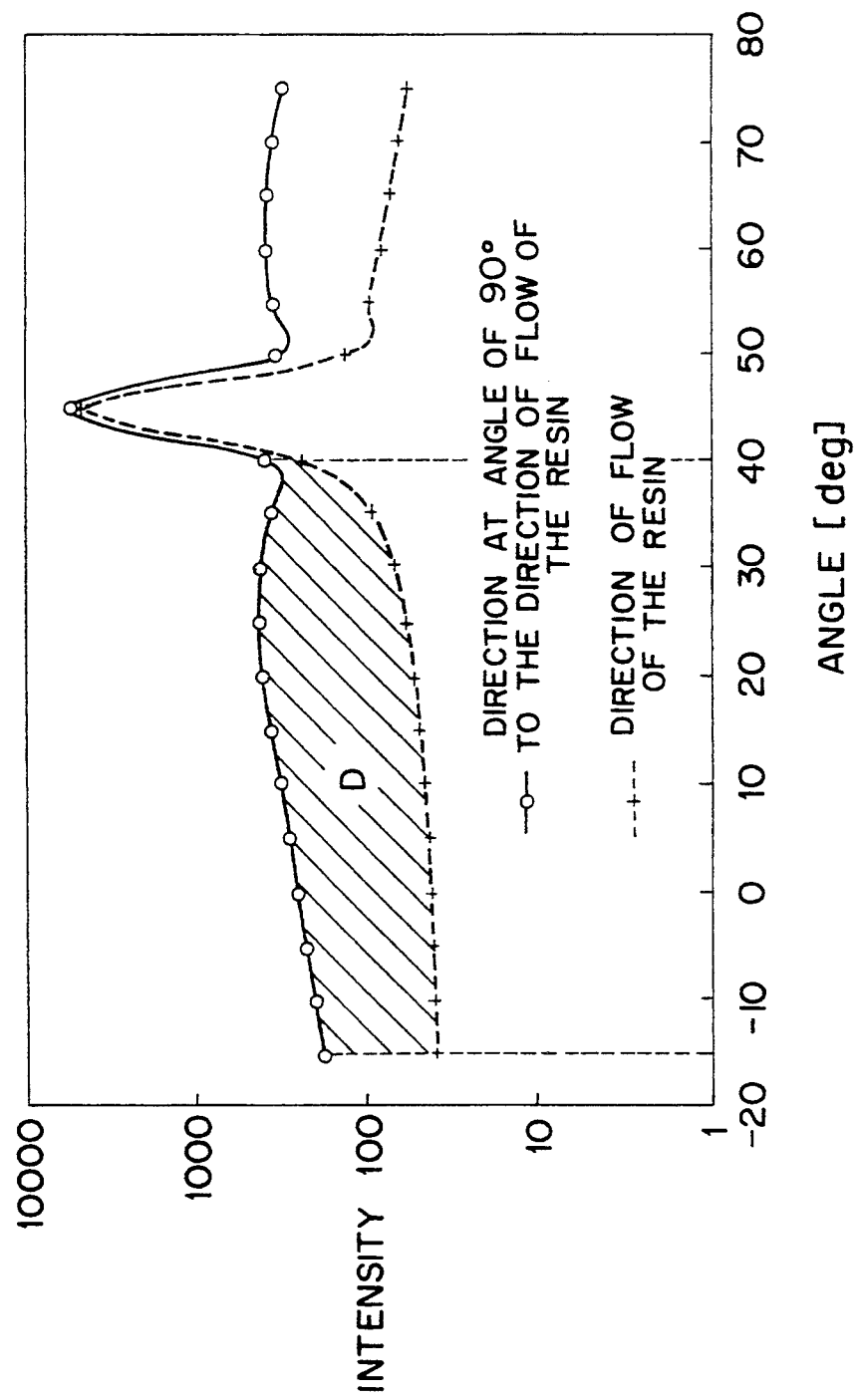
FIG. 14 is a graph showing the reflected light intensity distribution of a plastic molding produced in Test Example 9.

Measuring device: GCMS-3 gonio spectrophotometer manufactured by Murakami Color Research Laboratory
Incident angle: 45°
Light reception angle: −15° to 75°
Measurement intervals: 5°
Direction of measurement: in the molding, (1) direction of flow of resin and (2) direction at an angle of 90° to the direction of flow of resin An example of the results of measurement are shown in FIGS. 13 and 14. The intensity of reflected light is determined as a relative value subject to that the intensity of reflected light from the reference is 100. FIG. 13 is a graph showing the results of measurement in each direction of the conventional molding having a metallic luster produced in Test Example 26. As is apparent from FIG. 13, the molding has a reflected light distribution in the form of Mt. Fuji characteristic of the metallic luster, and the anisotropy is very small.

FIG. 14 is a graph showing the results of measurement of the plastic molding of the present invention produced in Test Example 9. As is apparent from FIG. 14, as opposed to FIG. 13, the luster has an intense anisotropy and a unique reflected light distribution.

Now, a method of determining the value showing the anisotropy of the luster will be described with reference to FIG. 14. In the molding having a high anisotropy as shown in FIG. 14, there is a large difference in the dependency of the intensity of the reflected light upon the angle between (1) the direction of flow of the resin and (2) the direction at an angle of 90° to the direction of flow of the resin. The value D indicating the anisotropy of the luster was defined by a value determined by integrating the difference in the intensity of the reflected light between both directions from −15° to 40° (the area of the hatched part in FIG. 14). In this case, the larger the value D, the higher the anisotropy of the luster. A comparison of the degree of the anisotropy of the luster was conducted based on the value D.

In the column of "anisotropy of luster with the naked eye" of Table 1 to Table 3, the results of judgment of whether or not the molding has a luster having an anisotropy are given, and symbols in that column have the following meaning:

ⓞ: the molding exhibits a luster having a very excellent anisotropy,
o: the molding exhibits a luster having an excellent anisotropy, and
x: the molding exhibits no luster having an excellent anisotropy.

The observation of the internal structure was conducted by preparing a section of each of a cross section in the direction of flow of the resin composition and a cross section in a direction at an angle of 90° to the direction of flow of the resin in molding with a microtome, conducting staining and observing the internal structure under a transmission electron microscope. The value of the L, P and Q of the dispersed resin was determined as follows;

(1) The first average value of L, P and Q of the dispersed resin was determined except for sizes of less than 0.02 μm.

(2) The average value in connection with sizes equal to or larger than the first average value was calculated again, as the configuration having sizes smaller than the first average value is regarded as showing only a part of the cross section of the dispersed resin.

The moldings of Test Examples 1, 8, 9, 4, 5 and 29 were subjected to the measurement of the reflection intensity at a light reception angle of −15°. The results are given in Table 5. The moldings of Test Examples 12, 13, 9, 14 and 15 were subjected to the measurement of the configuration of the dispersed resin at the bottom of the molding and the drop test number. The results are given in Table 6 and Table 7. The reflection intensity at an angle of −15° and the drop test number were measured by the following methods.

Reflection Intensity at Light Reception Angle of −15°.

Figure 16:
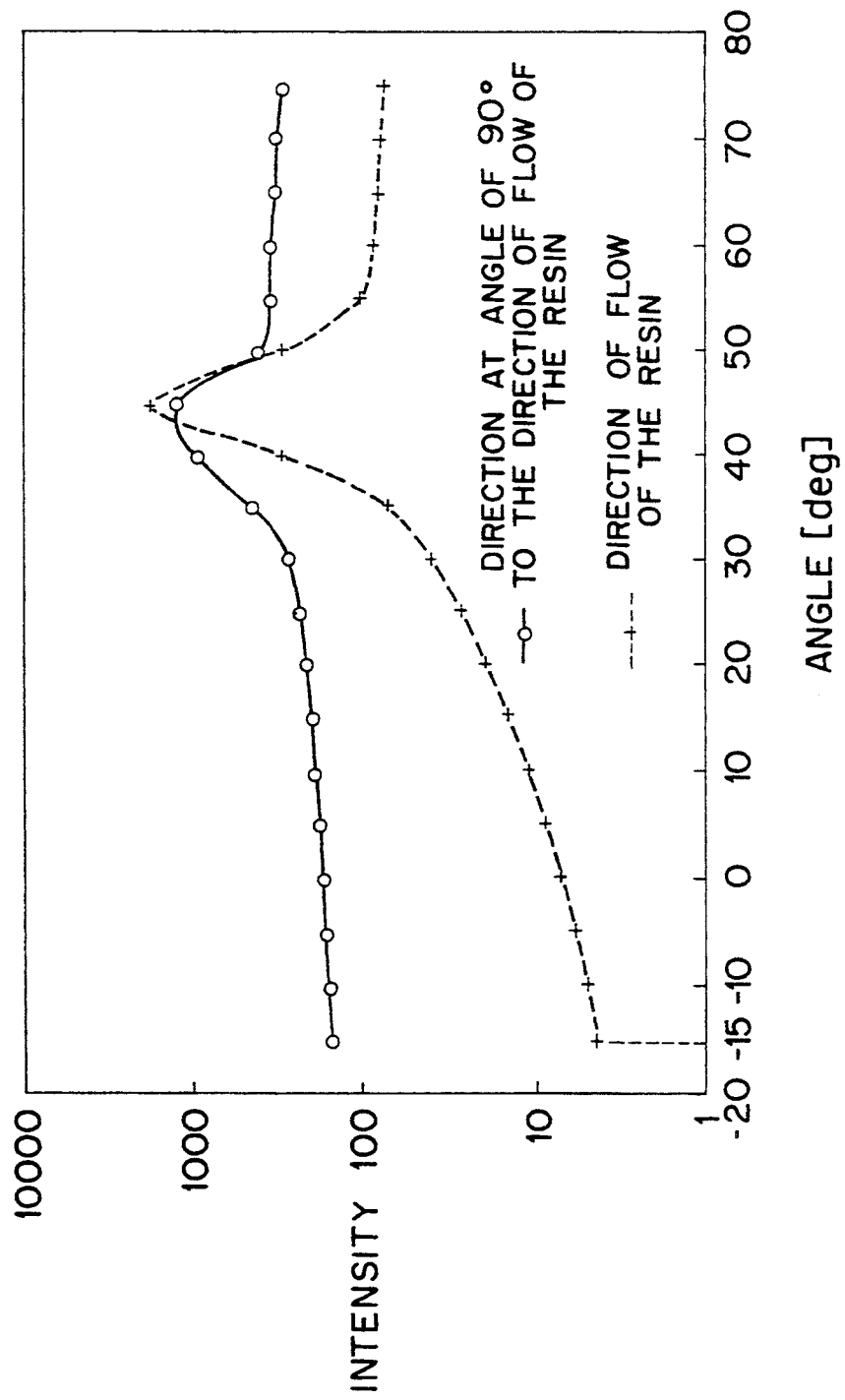
FIG. 16 is a graph showing the reflected light intensity distribution of a filmy molding which has been produced in Test Example 5 and has an anisotropic luster and the above internal structure over the whole direction of the thickness of the plastic molding.

FIG. 16 is a graph showing the results of measurement of the luster of a filmy molding which has been produced in Test Example 5 and has an anisotropic luster and the above-described internal structure along the whole direction of the thickness of the plastic molding, and FIG. 17 is a graph showing the results of measurement of the luster of a tubular molding which has been produced in Test Example 8 and has a spherical particulate titanium oxide dispersed on the internal surface side of a layer having the above internal structure.

As is apparent from the drawings, the presence of a substantially spherical resin dispersed on the inner surface side causes the intensity of reflected light to become relatively high particularly in the direction of flow of the resin at an angle (for example, a region where the light reception angle is about −15° to 20° in FIGS. 16 and 17) distant from the regular reflection angle (45° in this case). The softness of the luster increases with an increase in the intensity of reflected light in an angular region distant from the regular reflection angle. The intensity of reflected light at a light reception angle of −15° in the results of measurement in the direction of flow of the resin was used as a measure of the softness of the luster. The measurement of the intensity of reflected light was conducted under the same condition as that used in the measurement for representing the anisotropy of the luster numerically.

Drop Test Number

Since a molding, such as a bottle, comes into contact with the floor first at the bottom thereof, one of desired means for attaining a combination of the luster with the strength is to form an internal structure having a high impact strength at the bottom and, at the same time, to form an internal structure capable of providing an anisotropic luster at the parts other than the bottom. In the molding method of the present Example, since the gate in the injection molding of the closed-end parison is located at the bottom of the parison, the filling of the resin by injection begins with the parison at its bottom corresponding to the bottom of the bottle and ends with a part corresponding to the opening at the uppermost part of the bottle.

For this reason, in order to form the above internal structure, in the first half of the injection, a resin corresponding to the desired bottom part of the bottle was injection-filled on the lower shear rate side of the shear rate selected as the boundary shear rate value, and in the second half of the injection, the remaining resin was injection-filled on the higher shear rate side. The proportion of the amount of the resin filled in the first half and second half of the injection to the whole of the resin, the period of time taken for the filling and the shear rate at the gate at that time, and the configuration of the resin dispersed in the vicinity of the outer surface of the bottom of the bottle are given in Table 6. The configuration of the dispersed resin in the vicinity of the outer surface of the barrel required to have a luster is given in Table 1 to Table 3. In Table 6, when numeric values are given only in the column of "first half of injection", the whole of the resin was injected at one time under the given conditions.

The injection parison used in the injection blow molding is in the form of a closed-end cylinder having a length of about 130 mm, a circular cross section, an outer diameter of about 28 mm at the center of the barrel and a volume of 35.3 cm³ and the diameter of the gate in the injection molding of the parison is 2.0 mm.

As shown also in Table 6, conditions were set so that 25% of the resin and 75% of the resin were filled, respectively, for the portion required to have an impact resistance and the portion required to have a luster. In this case, a portion from the bottom of the bottle to a position about 20 mm thereabove was formed by the first half injection. The measured values of configuration of the dispersed resin given in Table 1 to Table 3 were determined by making use of a fragment which was cut out as a portion required to have an anisotropic luster from the barrel at its part 100 mm above the bottom of the bottle. On the other hand, the measured values of configuration of the dispersed resin given in Table 6 was determined by cutting out a fragment as a portion required to have an impact strength from the bottom at its position 10 mm above the bottom of the bottle and conducting the measurement on a layer in the vicinity of the outer surface with a width of 10 μm ranging from 20 μm to 30 μm in the direction of the thickness from the outer surface of the bottle.

The drop test number was evaluated by the following method. A bottle was filled with a suitable amount of water, capped and stored in a thermostatic chamber at 5° C. for 24 hr and freely dropped on a smooth concrete floor from a height of 1 m to determine the number of times of dropping necessary for breaking the bottle. The dropping was conducted 10 times at the maximum for 10 bottles regarding each condition. The results are given in Table 7.

Regarding the moldings produced in the Test Examples, the following facts have become apparent from the results given in Table 1 to Table 7. The results will now be described with reference to Example A of the present invention, Comparative Example, Example B of the present invention, Example C of the present invention, Example D of the present invention, and Example E of the present invention.

Example A of the Present Invention

Test Examples 1 and 2

The resin compositions had a melt viscosity ratio of less than 0.5. The observation of the configuration of the dispersed resin in a layer having a thickness of about 10 μm at a position of about 1/50 of the wall thickness from the surface of the center of the plate has revealed that the internal structure was such that the resin having a configuration given in Table 1 was oriented in the direction of flow of the resin in molding, and such an internal structure extended from the surface to within the layer at its position which was about ¼ of the wall thickness from the surface. The value D indicating the anisotropy of the luster was sufficiently high, and an excellent anisotropic luster was recognized also in the evaluation with the naked eye.

Test Examples 4 and 5

Both the resin compositions had a melt viscosity ratio of less than 0.5. The observation of the configuration of the dispersed resin in a layer having a thickness of about 10 um at a position of about ⅓ of the wall thickness from the surface has revealed that the internal structure was such that the resin having a configuration given in Table 1 was oriented in the direction of flow of the resin in molding, and such an internal structure extended along the whole direction of the thickness of the molding. The luster had an excellent anisotropy, and also the results of measurement of the luster suggested that the anisotropy was high.

Test Examples 9, 14, 15, 20, 21, 22 and 25

All the resin compositions had a melt viscosity ratio of less than 0.5. Further, a storage modulus of each resin used herein had the relationship $E_A < E_B$ in the blowing. A part of the barrel (a position C in FIG. 1) was cut out, and the observation of the internal structure in a layer having a thickness of about 10 μm at a position of about 1/10 of the wall thickness from the surface has revealed that the internal structure was such that the resin having a configuration given in Table 1 to Table 3 was oriented in the direction of the height of the bottle, and such an internal structure extended from the surface to a depth of about ¼ to 1/5 of the wall thickness from the surface. The luster had an excellent anisotropy, and also the results of measurement of the luster suggested that the anisotropy was high.

Test Example 28

The observation of the internal structure in a layer having a thickness of about 10 μm from around the boundary between the outer layer and the intermediate layer towards the center has revealed that the internal structure was such that the dispersed resin having a configuration given in Table 3 was oriented in the direction of the height of the bottle. The luster had an excellent anisotropy, and also the results of measurement of the luster suggested that the anisotropy was high.

Test Example 30

The resin compositions had a melt viscosity ratio of less than 0.5. Further, a storage modulus of each resin used herein had the relationship $E_A < E_B$ in the blowing. A part of the barrel (a position C in FIG. 1) was cut out, and the observation of the internal structure in a layer having a thickness of about 10 μm at a position of about 1/10 of the wall thickness from the surface has revealed that the internal structure was such that the resin having a configuration given in Table 3 was oriented in the direction of the height of the bottle, and such an internal structure extended from the surface to a depth of about 1/5 of the wall thickness from the outer surface. The luster had an excellent anisotropy, and also the results of measurement of the luster suggested that the anisotropy was high.

Comparative Example

Test Example 3

The melt viscosity ratio of both the resins in injection was 0.59, and the observation of the configuration of the dispersed resin in the same manner as that of Test Examples 1 and 2 has revealed that, as given in Table 1, the configuration was outside the scope of the present invention and the resin was dispersed in its configuration along the whole direction of the thickness. No anisotropy was observed in the luster, and also from the results of measurement of the luster, it is apparent that the D value is small and the anisotropic luster is very weak.

Test Example 7

The melt viscosity ratio of both the resins in injection was 2.14, and the observation of the configuration of the dispersed resin in the same manner as that of Test Examples 4 and 5 has revealed that, as given in Table 1, the configuration was outside the scope of the present invention and the resin was dispersed in its configuration along the whole direction of thickness. No anisotropy was observed in the luster, and in the measurement of the luster, the D value was low.

Test Example 16

The observation of the configuration of the dispersed resin in the same manner as that of Test Example 9 has revealed that the molding had a substantially transparent appearance as a whole and scarcely any anisotropic luster was observed because the configuration of the dispersed resin fell within the scope of the present invention but the composition ratio of the resin composition was 99:1.

Test Example 17

The moldability was poor because the composition ratio of the resin composition was 40:60. The observation of the dispersed resin in the same manner as that of Test Example 9 has revealed that the matrix phase and the dispersed phase comprise PMMA and PET, respectively, that is, the internal structure is opposite to that of Test Example 9. The luster of the molding was white and opaque as a whole and exhibited no anisotropic luster.

Test Examples 23, 24, 26 and 27

The dispersed resin was observed in the same manner as that of Test Example 9 and, as given in Table 3, found to be outside the scope of the present invention. No anisotropy was observed in the luster of the molding, and in Test Examples 26 and 27, the dispersed resin was flaky and exhibited a metallic luster. In all the moldings, also the D value indicating the extent of the anisotropy of the luster was low.

Example B of Present Invention (Example of Molding wherein Resin Composition further Comprises Inorganic Filler)

Test Example 6

The observation of the configuration of the dispersed resin in a layer having a thickness of about 10 μm located at a position of about ⅓ of the wall thickness from the outer surface has revealed that the internal structure was such that the dispersed resin having a configuration given in Table 1 was oriented in the direction of flow of the resin composition and titanium oxide particles were homogeneously dispersed, and such an internal structure extended along the whole direction of the thickness of the molding. The molding exhibited an excellent anisotropic luster having a subtle softness and provided a quiet high-gradeness. In this molding, the anisotropic luster was comparable to that of, for example, the molding of Test Example 4, and the luster further had a softness.

Test Example 18

A part of the barrel (a position C in FIG. 1) was cut out, and the observation of the internal structure in a layer having a thickness of about 10 μm at a position of about 1/10 of the wall thickness from the outer surface has revealed that the internal structure was such that the resin having a configuration given in Table 2 was oriented in the direction of the height of the bottle and titanium oxide particles were homogeneously dispersed, and such an internal structure extended from the outer surface to a depth of about ¼ of the wall thickness from the surface. The molding exhibited an excellent anisotropic luster having a subtle softness and provided a quiet high-gradeness. In this molding, the anisotropic luster was comparable to that of, for example, the molding of Test Example 9, and the luster further had a softness.

Example C of Present Invention (Molding having Layer containing Substantially Spherical Particles under Layer Containing, in Dispersed State, Resin in Substantially Rod Form Test Example 1

The observation of the configuration of the dispersed resin at the center in the direction of the thickness of the molding has revealed that substantially spherical PMMA particles as given in Table 5 were dispersed. The reflection intensity at a light reception angle of −15° in the direction of flow of the resin was large, and the luster of the molding provided a quiet high-gradeness. The anisotropic luster was softer than that of Test Examples 4 and 5.

Test Example 8

In the outer layer comprising PETG and PP, a layer having a thickness of about 10 μm at a position of about 1/10 of the wall thickness from the outer surface had such a structure that the dispersed resin in a rodlike form given in Table 1 was oriented. On the other hand, the inner surface side layer had such a structure that substantially spherical titanium oxide particles were dispersed. The luster of the molding provided a quiet high-gradeness. The anisotropic luster was softer than that of Test Examples 4 and 5.

Test Example 9

A part of the barrel (a position C in FIG. 1) was cut out, and the observation of the internal structure in a layer having a thickness of about 10 μm at a position of about 1/10 of the wall thickness from the outer surface has revealed that the internal structure was such that the resin having a configuration given in Table 1 was oriented in the direction of the height of the bottle, while in the center in the direction of the thickness, substantially spherical PMMA particles given in Table 5 were dispersed. The luster of the molding provided a quiet high-gradeness. The anisotropic luster was softer than that of Test Examples 4 and 5.

Test Example 29

The internal structure was observed in the same manner as that of Test Example 9 and, as a result, was found to be such that the resin having a configuration given in Table 3 was oriented in the direction of the height of the bottle, while in a layer on the inner surface side, substantially spherical titanium oxide particles were dispersed. The luster of the molding provided a quiet high-gradeness. The anisotropic luster was softer than that of Test Examples 4 and 5.

Test Example 31

The molding had on its outer surface an uneven pattern transferred from a mold subjected to sandblasting. A part of the barrel (a position C in FIG. 1) was cut out, and the observation of the internal structure in a layer having a thickness of about 10 μm at a position of about 1/10 of the wall thickness from the outer surface has revealed that the internal structure was such that the resin having a configuration given in Table 1 was oriented in the direction of the height of the bottle, while in the center in the direction of the thickness, substantially spherical PMMA particles given in Table 5 were dispersed. The luster of the molding provided a quiet high-gradeness, and the surface reflected light was scattered, so that the anisotropic luster was softer than that of Test Example 9. The evaluation of the softness of the luster with the naked eye was "o to ⊚".

Example D of Present Invention (Example of Molding having Anisotropic Luster and Surface of Third Order)

Test Example 9

The shape of the molding produced in Test Example 9 was as follows. The upper part of the bottle had a substantially hemispherical surface A of the third order having a curvature of 60 mm in the radius (major radius/minor radius: 1.2). On the other hand, the vicinity of the bottom had a surface B of the third order having a curvature of 11.5 mm in the minor radius and 52 mm in the major radius (major radius/minor radius: 2.2). The center of the barrel had a surface C of the second order having a radius of 50 mm. Wall surface portions A, B and C (see FIG. 1) were cut out, and the observation of the internal structure in a layer having a thickness of about 10 μm at a position of about 1/10 of the wall thickness from the outer surface has revealed that the internal structure was such that the resin having a configuration on the average given in Table 1 was oriented in the direction of the height of the bottle. This satisfies the requirement of the present invention.

Regarding the appearance, the bottle had a pearlescent luster having an anisotropy as a whole. Portions A and B exhibited an anisotropic pearlescent luster in a geometric pattern under a plurality of light sources. Particularly in portion A, the intervals of network patterns were relatively large, and round reflected images crossed each other to exhibit an excellent pearlescent luster in a moiré pattern. On the other hand, in a portion having a surface of the second order in the portion C, although a pearlescent luster was developed, any moiré pattern as seen in the portions A and B did not appear at all.

Text Example 10

The molding produced in Test Example 10 was in a bottle form. The upper part of the bottle had a surface A of the third order in a flat spherical form having a major radius of 41 mm and a minor radius of 30 mm (major radius/minor radius: 1.36). On the other hand, the lower part had a surface B of the third order in a flat spherical form having a major radius of 50 mm and a minor radius of 40 mm (major radius/minor radius: 1.25). The center of the barrel had a surface C of the second order having a radius of 26 mm.

Wall surface portions A, B and C (see FIG. 2) of the above bottle were cut out with a cutter, and the internal structure was observed in the same manner as that of Test Example 9 and, as a result, was found to be such that the dispersed resin in a rod form was oriented in the direction of the height of the bottle. No significant difference was observed in the rod structure among the wall surfaces A, B and C, and the configuration on the average was as given in Table 1 and fell within the scope of the present invention.

Regarding the appearance, the bottle had an anisotropic pearlescent luster as a whole. In particular, portions A and B exhibited a network pattern in a moiré pattern form, and the pattern moved according to the variation in the angle of view, which provided a unique stereoscopic appearance. On the other hand, in a portion having a surface of the second order in the portion C, although a pearlescent luster was developed, any moiré pattern as seen in the portions A and B did not appear.

Further, in the moldings having no surface of the third order, such as the moldings of Test Examples 1 and 8, no moiré pattern was observed.

Test Example 11

The molding produced in Test Example 11 was in the form of a bottle comprising an upper part in a truncated conical form A and a lower part in a cylindrical form having a radius of 50 mm. Further, the seam between the mouth of the bottle and the truncated conical part and the seam between the truncated conical part and the cylindrical part had a surface of the third order. Specifically, the portion connected to the mouth had a surface C of the third order having a major radius of 48 mm and a minor radius of 6 mm, and the portion of connection between the truncated conical part and the cylindrical part had a surface D of the third order having a major radius of 50 mm and a minor radius of 8 mm. Since, however, the surface of the third order is different from that described above, no network pattern in a moiré pattern form was observed.

Wall surface portions A, B, C and D (see FIG. 3) of the above bottle were cut out with a cutter, and the internal structure was observed in the same manner as that of Test Example 9 and, as a result, was found to be such that the dispersed resin in a rod form was oriented in the direction of the height of the bottle. No significant difference was observed in the rod structure among the wall surfaces A, B, C and D, and the configuration on the average was as given in Table 2 and satisfied the requirement specified in the present invention. Regarding the appearance, the bottle had a pearlescent luster having an anisotropy as a whole.

Example E of Present Invention (Molding having Combination of Anisotropic Luster with High Impact Resistance)

Test Examples 12 and 13

Both the resin compositions had a melt viscosity ratio of less than 0.5. Further, both the resin compositions had a storage modulus of $E_A < E_B$ in the blowing of the resins. Further, the shear rate at the gate in both the first half stage and the second half stage of the parison injection molding satisfied the requirement specified in the present invention on the lower shear rate side and the higher shear rate side. The observation of the configuration of the dispersed resin in the barrel of the bottle has revealed that the configuration in a layer having a thickness of about 10 μm at a position of 1/10 of the wall thickness from the surface was as given in Table 2 and such a structure extended to a portion of about ¼ of the wall thickness from the outer surface. On the other hand, the configuration of the dispersed resin in the vicinity of the outer surface of the bottom was as given in Table 6. The value D indicating the anisotropy of the luster determined in the barrel of the bottle was sufficiently large, and sufficient development of the anisotropic luster was confirmed also in the evaluation with the naked eye. Further, as is apparent from the results of the drop test given in Table 7, the bottle had a sufficient impact strength. Thus, the bottle was a molding excellent in both the anisotropic luster and impact strength.

TABLE 1

| Test Ex. No. | Resin compsn. Resin (A) + Resin (B) (compsn. ratio, wt %) | Molding method Configuration of molding | Resin temp. in injection or extrusion (°C.) | Melt viscosity ratio in injection or extrusion (°C.) | Resin temp. in blow molding (°C.) |
|---|---|---|---|---|---|
| 1 | PET ① + PMMA ① (85:15) | injection plate | 280 | 0.37 | — |
| 2 | PET ② + PP ① (85:15) | injection plate | 280 | 0.30 | — |
| 3 | PET ② + LDPE ① (85:15) | injection plate | 280 | 0.59 | — |
| 4 | PET ① + PMMA ① (85:15) | extrusion film | 280 | 0.40 | — |
| 5 | PETG ① + PP ① (85:15) | extrusion film | 220 | 0.32 | — |
| 6 | PET ① + PMMA ① + titanium oxide ((85:15):0.1) | extrusion film | 280 | 0.40 | — |
| 7 | PET ① + HDPE ① (85:15) | extrusion film | 280 | 2.14 | — |
| 8 | PETG ① + PP ①/ PETG ① + titanium oxide (85:15)/(90:10) | extrusion tube | 220 | 0.32 | — |
| 9 | PET ① + PMMA ① (85:15) | injection blow bottle I | 280 | 0.37 | 105 |
| 10 | PET ① + PMMA ① (85:15) | injection blow bottle II | 280 | " | " |

| Text Ex. No. | Storage modulus in blow molding (dyn/cm$^2$) resin (A) | resin (B) | Mean particle diam of. dispersed resin (B) in pellet (μm) | Configuration of resin (B) P/Q | (P + Q)/L | Measured value of D as measure of extent of anisotropy | Anisotropy of luster with the naked eye |
|---|---|---|---|---|---|---|---|
| 1 | — | — | 1.0 | 1.9 | $9.6 \times 10^{-3}$ | $9.6 \times 10^3$ | ○ |
| 2 | — | — | 4.5 | 2.2 | $8.0 \times 10^{-2}$ | $8.7 \times 10^3$ | ○ |
| 3 | — | — | 5.0 | 2.5 | $5.3 \times 10^{-1}$ | $8.5 \times 10^2$ | x |
| 4 | — | — | 1.0 | 1.5 | $6.2 \times 10^{-3}$ | $1.4 \times 10^4$ | ○ |
| 5 | — | — | 4.7 | 1.7 | $3.1 \times 10^{-2}$ | $1.2 \times 10^4$ | ○ |
| 6 | — | — | 1.0 | 1.4 | $9.5 \times 10^{-3}$ | $8.9 \times 10^3$ | ○ |
| 7 | — | — | 4.9 | 1.3 | $6.0 \times 10^{-1}$ | $2.2 \times 10^3$ | x |
| 8 | — | — | 4.7 | 1.5 | $8.1 \times 10^{-3}$ | $1.3 \times 10^4$ | ○ |
| 9 | $3.4 \times 10^7$ | $5.9 \times 10^8$ | 1.0 | 4.5 | $1.0 \times 10^{-2}$ | $1.5 \times 10^4$ | ○ |
| 10 | " | " | " | 4.8 | $1.6 \times 10^{-2}$ | $1.1 \times 10^4$ | ○ |

TABLE 2

| Test Ex. No. | Resin compsn. Resin (A) + Resin (B) (compsn. ratio, wt %) | Molding method Configuration of molding | Resin temp. in injection or extrusion (°C.) | Melt viscosity ratio in injection or extrusion (°C.) | Resin temp. in blow molding (°C.) |
|---|---|---|---|---|---|
| 11 | PET ① + PMMA ① (85:15) | injection blow bottle III | 280 | 0.37 | 105 |
| 12 | PET ① + PMMA ① (85:15) | injection blow bottle I | 280 | " | " |
| 13 | PET ① + PMMA ① (85:15) | injection blow bottle I | 280 | " | " |
| 14 | PET ① + PMMA ① | injection blow | 280 | " | " |

TABLE 2-continued

| Test Ex. No. | Resin compsn. Resin (A) + Resin (B) (compsn. ratio, wt %) | Molding method Configuration of molding | Resin temp. in injection or extrusion (°C.) | Melt viscosity ratio in injection or extrusion (°C.) | Resin temp. in blow molding (°C.) |
|---|---|---|---|---|---|
| 15 | PET ① + PMMA ① (95:5) (70:30) | injection blow bottle I | 280 | " | " |
| 16 | PET ① + PMMA ① (99:1) | injection blow bottle I | 280 | " | " |
| 17 | PET ① + PMMA ① (40:60) | injection blow bottle I | 280 | " | " |
| 18 | PET ① + PMMA ① + titanium oxide ((85:15):0.3)) | injection blow bottle I | 280 | " | " |
| 20 | PET ① + PMMA ② (85:15) | injection blow bottle I | 280 | 0.42 | " |

| Test Ex. No. | Storage modulus in blow molding (dyn/cm²) resin (A) | Storage modulus in blow molding (dyn/cm²) resin (B) | Mean particle diam. of dispersed resin (B) in pellet (μm) | Configuration of resin (B) P/Q | Configuration of resin (B) (P + Q)/L | Measured value of D as measure of extent of anisotropy | Anisotropy of luster with the naked eye |
|---|---|---|---|---|---|---|---|
| 11 | 3.4 × 10⁷ | 5.9 × 10⁸ | 1.0 | 4.9 | 2.3 × 10⁻² | 1.1 × 10⁴ | o |
| 12 | " | " | " | 4.0 | 1.2 × 10⁻² | 1.3 × 10⁴ | o |
| 13 | " | " | " | 4.9 | 5.3 × 10⁻² | 8.2 × 10³ | o |
| 14 | " | " | 0.7 | 3.4 | 3.0 × 10⁻² | 1.2 × 10⁴ | o |
| 15 | " | " | 2.1 | 6.2 | 1.6 × 10⁻² | 1.6 × 10⁴ | o |
| 16 | " | " | 0.7 | 4.7 | 1.7 × 10⁻² | 2.2 × 10³ | x |
| 17 | " | " | — | matrix/dispersed layer inversion | | 7.5 × 10² | x |
| 18 | " | " | 1.0 | 5.0 | 1.3 × 10⁻² | 8.2 × 10³ | o |
| 20 | " | 6.0 × 10⁸ | 1.2 | 5.2 | 9.0 × 10⁻² | 9.6 × 10³ | o |

TABLE 3

| Test Ex. No. | Resin compsn. Resin (A) + Resin (B) (compsn. ratio, wt %) | Molding method Configuration of molding | Resin temp. in injection or extrusion (°C.) | Melt viscosity ratio in injection or extrusion (°C.) | Resin temp. in blow molding (°C.) |
|---|---|---|---|---|---|
| 21 | PET ② + PMMA ① (85:15) | injection blow bottle I | 280 | 0.31 | 95 |
| 22 | PET ② + PMMA ② (85:15) | injection blow bottle I | 280 | 0.32 | " |
| 23 | PET ① + PMMA ③ (85:15) | injection blow bottle I | 280 | 0.58 | 105 |
| 24 | PET ① + PMMA ③ (85:15) | injection blow bottle I | 280 | " | 95 |
| 25 | PET ② + PP ① (85:15) | injection blow bottle I | 280 | 0.30 | 90 |
| 26 | PET ② + PP ① (85:15) | injection blow bottle I | 280 | " | 115 |
| 27 | PET ② + LDPE ① (85:15) | injection blow bottle I | 280 | 0.59 | 100 |
| 28 | PET ① /PET ① + PMMA ① (85:15)/PET ① | injection blow bottle I | 280 | 0.37 | 105 |
| 29 | PET ① PMMA ① (85:15)/PET ① + titanium oxide (90:10)/PET ① + PMMA ① (85:15) | injection blow | 280 | " | " |
| 30 | PETG ① + PP ① (85:15) | injection blow bottle I | 220 | 0.32 | 100 |

| Text Ex. No. | Storage modulus in blow molding (dyn/cm²) resin (A) | Storage modulus in blow molding (dyn/cm²) resin (B) | Mean particle diam. of dispersed resin (B) in pellet (μm) | Configuration of resin (B) P/Q | Configuration of resin (B) (P + Q)/L | Measured value of D as measure of extent of anisotropy | Anisotropy of luster with the naked eye |
|---|---|---|---|---|---|---|---|
| 21 | 5.6 × 10⁷ | 3.3 × 10⁹ | 0.9 | 3.9 | 8.0 × 10⁻³ | 1.6 × 10⁴ | o |
| 22 | " | 3.4 × 10⁹ | 1.0 | 4.2 | 1.0 × 10⁻² | 1.5 × 10⁴ | o |
| 23 | 3.8 × 10⁷ | 1.4 × 10⁹ | 1.3 | 3.5 | 6.8 × 10⁻¹ | 3.3 × 10³ | x |
| 24 | 5.6 × 10⁷ | 6.1 × 10⁹ | " | 3.9 | 7.2 × 10⁻¹ | 3.8 × 10³ | x |
| 25 | 6.1 × 10⁷ | 1.8 × 10⁹ | 4.5 | 9.2 | 1.1 × 10⁻¹ | 1.7 × 10⁴ | o |
| 26 | 4.4 × 10⁷ | 1.0 × 10⁵ | " | 29 | 4.2 × 10⁻¹ | 3.0 × 10³ | x |
| 27 | 4.9 × 10⁷ | 1.5 × 10⁵ | 5.0 | 63 | 7.1 × 10⁻¹ | 9.1 × 10² | x |
| 28 | 3.4 × 10⁷ | 5.9 × 10⁸ | 1.0 | 4.7 | 1.1 × 10⁻¹ | 9.3 × 10³ | o |
| 29 | " | " | " | 4.8 | 1.5 × 10⁻² | 9.9 × 10³ | o |
| 30 | 5.0 × 10⁷ | 8.9 × 10⁸ | 4.7 | 3.3 | 1.8 × 10⁻¹ | 8.2 × 10³ | o |

TABLE 4

| Symbol | Name | Trade name | Manufacturer | Intrinsic viscosity | Crystn. temp. (°C.) | Melt flow index (g/10 min) |
|---|---|---|---|---|---|---|
| PET ① | polyethylene terephthalate | J125 | Mitsui PET Resin | 0.77 | — | — |
| PET ② | polyethylene terephthalate | J155 | Mitsui PET Resin | 1.05 | — | — |
| PETG ① | terephthalic acid/ethylene glycol/cyclohexanedimethanol copolymer | PETG6763 | Eastman | 0.75 | — | — |
| PMMA ① | polymethyl methacrylate | Delpet 560F | Asahi Chemical Industry | — | — | 6.5 (ASTM D1238 condition L) |
| PMMA ② | polymethyl methacrylate | Delpet 60N | Asahi Chemical Industry | — | — | 4 (ASTM D1238 condition L) |
| PMMA ③ | polymethyl methacrylate | Delpet 80N | Asahi Chemical Industry | — | — | 2 (ASTM D1238 condition L) |
| PP ① | polypropylene | 6216E | Mitsubishi Kasei | — | 108 | 3.0 (JIS K-6758) |
| HDPE ① | high-density polyethylene | 5503D | Showa Denko | — | — | 0.3 (JIS K-6760) |
| LDPE ① | low-density polyethylene | Mirason 50 | Mitsui Petrochemical Industries | — | 93 | 1.9 (ASTM D1238) |

TABLE 5

| Test Ex. No. | Molding method Configuration of molding | Substantially spherical particle and its configuration | | Reflection intensity at −15° | Softness of luster with the naked eye |
|---|---|---|---|---|---|
| | | P/Q | (P + Q)/L | | |
| 1 | injection plate | resin (B) 1.5 | 1.2 | 64 | o |
| 8 | extrusion pipe | titanium oxide particle | | 55 | o |
| 9 | injection blow bottle I | resin (B) 1.9 | 1.0 | 53 | o |
| 29 | injection blow bottle I | substantially spherical titanium oxide particle | | 67 | o |
| 4 | extrusion film | no layer contg. substantially spherical particle | | 5 | x |
| 5 | extrusion film | no layer contg. substantially spherical particle | | 4 | x |

TABLE 6

| Text Ex. No. | Molding method Configuration of molding | 1st half of injection (formation of bottom of parison) | | | 2nd half of injection (formation of barrel of parison) | | | Configuration of resin (B) in vicinity of outer surface of bottom | |
|---|---|---|---|---|---|---|---|---|---|
| | | amount of filling of resin (%) | injection time (sec) | shear rate in injection (sec$^{-1}$) | amount of filling of resin (%) | injection time (sec) | shear rate in injection (sec$^{-1}$) | P/Q | (P + Q)/L |
| 12 | injection blow bottle I | 25 | 2.2 | $5.1 \times 10^3$ | 75 | 1.0 | $3.4 \times 10^4$ | 5.5 | $5.2 \times 10^{-1}$ |
| 13 | injection blow bottom I | 25 | 1.5 | $7.5 \times 10^3$ | 75 | 1.5 | $2.3 \times 10^4$ | 5.3 | $4.1 \times 10^{-1}$ |
| 9 | injection blow bottom I | 100 | 1.3 | $3.4 \times 10^4$ | — | — | — | 4.7 | $1.2 \times 10^{-2}$ |
| 14 | injection blow bottle I | 100 | 1.3 | $3.4 \times 10^4$ | — | — | — | 3.7 | $4.1 \times 10^{-2}$ |
| 15 | injection blow bottle I | 100 | 1.3 | $3.4 \times 10^4$ | — | — | — | 6.5 | $2.5 \times 10^{-2}$ |

TABLE 7

| Text Ex. No. | Proportions of bottles borken in respective number of times of dropping (%, cumulated value) | | | | | | | | | |
|---|---|---|---|---|---|---|---|---|---|---|
| | 1 | 2 | 3 | 4 | 5 | 6 | 7 | 8 | 9 | 10 |
| 12 | 0 | 0 | 0 | 0 | 0 | 10 | 10 | 20 | 20 | 20 |
| 13 | 0 | 0 | 0 | 0 | 0 | 0 | 0 | 0 | 10 | 10 |
| 9 | 0 | 10 | 10 | 30 | 60 | 100 | 100 | 100 | 100 | 100 |
| 14 | 0 | 0 | 10 | 30 | 10 | 50 | 80 | 100 | 100 | 100 |
| 15 | 20 | 30 | 50 | 80 | 100 | 100 | 100 | 100 | 100 | 100 |

What is claimed is:

1. A plastic molding having an inner surface and an outer surface comprising 98 to 50 parts by weight of a thermoplastic polyester resin (A) and 2 to 50 parts by weight of a resin (B) incompatible with said thermoplastic polyester resin (A), said resin (B) being dispersed in said resin (A) substantially as rods, in a layer and satisfying the requirement represented by the following formulae (1) and (2):

$$1 \leq P/Q \leq 10 \quad (1)$$

$$(P+Q)/L \leq 0.5 \quad (2)$$

wherein L, P and Q represent the size of the particle of said resin (B) and respectively have the following values:

L: the average length (μm) in the direction of stretching of the particle;

P: the average major axis (μm) in the case where a section perpendicular to the direction of stretching of the particle is approximated to be elliptical; and Q: the average minor axis (μm) in the case where the section perpendicular to the direction of stretching of the particle is approximated to be elliptical;

said rods being oriented in the longitudinal direction parallel to the outer surface of said plastic molding and in the direction of flow of the resin composition during molding and wherein said outer surface has a homogenous, anisotropic luster.

2. A plastic molding according to claim 1, wherein said resin composition further comprises less than 0.5% by weight of an inorganic filler.

3. A plastic molding according to claim 1, which has a layer containing, in a dispersed state, the resin (B) in a substantially spherical form capable of satisfying the requirement represented by the following formula (3) or a layer containing a substantially spherical filler capable of satisfying the requirement represented by the following formula (3) on the inner surface side of the layer containing, in a dispersed state, the resin (B) in a substantially rod form $$0.25 \leq Q'/L' \qquad (3)$$

wherein L' and Q' represent the size of the shape of the resin (B) or filler and respectively have the following values:

L': the average length (μm) of a particle in the direction of stretching; and

Q': the average minor axis (μm) in the case where a section perpendicular to the direction of stretching of the particle is approximated to be elliptical.

4. A plastic molding according to claim 1, further comprising, in a part of said plastic molding, resin (B) in a layer in the vicinity of the outer surface of the plastic molding in a form capable of satisfying the requirement represented by the following formulae (4) and (5) or the following formulae (6) and (7)

$$10 \leq P/Q \leq 20 \qquad (4)$$

$$0.1 \leq (P+Q)/L \leq 2 \qquad (5)$$

$$1 \leq P/Q \leq 10 \qquad (6)$$

$$0.3 \leq (P+Q)/L \leq 2 \qquad (7)$$

wherein L, P, and Q are as defined in claim 1.

5. A plastic molding according to claim 1, wherein said resin composition comprises a combination of the resin (A) with the resin (B) capable of satisfying the requirement represented by the following formula (8) or the following formulae (8) and (9)

$$\eta_B/\eta_A < 0.5 \qquad (8)$$

$$E_A < E_B \qquad (9)$$

wherein, $\eta_A$, $\eta_B$, $E_A$ and $E_B$ respectively have the following values:

$\eta_A$: the melt viscosity of said resin (A) at the temperature and shear rate in injection or extruding;

$\eta_B$: the melt viscosity of said resin (B) at the temperature and shear rate in injection or extruding;

$E_A$: the storage modulus of said resin (A) at the resin temperature in blowing or stretching; and $E_B$: the storage modulus of said resin (B) at the resin temperature in blowing or stretching.

6. A plastic molding according to claim 1, wherein said resin (A) comprises ethylene terephthalate as major repeating unit and has an intrinsic viscosity of 0.65 to 1.40.

7. A plastic molding according to any claim 1, wherein said resin (B) comprises at least one resin selected from the group consisting of a polyolefin resin, a poly(meth)acrylic resin, a polystyrene resin, a polycarbonate resin and a polyamide resin.

8. A plastic molding according to claim 1, wherein the outer surface of said plastic molding has at least one three-dimensional curved surface portion having a radius of 10 to 300 mm.

* * * * *